United States Patent
Yoshida et al.

(10) Patent No.: US 6,307,591 B1
(45) Date of Patent: Oct. 23, 2001

(54) IMAGING APPARATUS INCLUDING DEVICE FOR A SELECTIVELY CHANGING ASPECT RATIOS

(75) Inventors: Hidetaka Yoshida, Kashihara; Masatugu Daiju, Sakurai; Toshio Isoe, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/982,343

(22) Filed: Dec. 2, 1997

(30) Foreign Application Priority Data

Dec. 4, 1996 (JP) .................................................. 8-324085

(51) Int. Cl.[7] .............................. H04N 7/01; G03B 17/00
(52) U.S. Cl. .......................... 348/445; 396/435; 348/335
(58) Field of Search ..................................... 348/335, 340, 348/445, 341, 333.06, 333.02, 333.12, 361; 396/312, 378, 435, 436, 374

(56) References Cited

U.S. PATENT DOCUMENTS

| | | | |
|---|---|---|---|
| 4,706,122 | * 11/1987 | Akiyama | 348/445 |
| 4,805,998 | * 2/1989 | Chen et al. | 350/420 |
| 5,309,241 | * 5/1994 | Hoagland | 348/445 |
| 5,347,313 | * 9/1994 | Choi | 348/140 |
| 5,521,635 | * 5/1996 | Mitsuhashi et al. | 348/207 |
| 5,550,754 | * 8/1996 | McNelley et al. | 364/514 |
| 5,794,090 | * 8/1998 | Oshima et al. | 396/435 |
| 5,856,849 | * 1/1999 | Aihara | 348/445 |
| 5,903,706 | * 5/1999 | Wakabayashi et al. | 386/117 |
| 6,097,900 | * 8/2000 | Haraguchi | 396/435 |

FOREIGN PATENT DOCUMENTS

| | | |
|---|---|---|
| 04082639 | * 4/1992 | (JP) . |
| 252 452 | * 4/1992 | (JP) . |
| 316 406 | * 4/1992 | (JP) . |

* cited by examiner

Primary Examiner—Wendy R. Garber
Assistant Examiner—Rashawn N. Tillery
(74) Attorney, Agent, or Firm—Nixon & Vanderhye P.C.

(57) ABSTRACT

An imaging apparatus has a CCD with a predetermined aspect ratio, and a converging lens for projecting incident light onto the CCD. In the imaging apparatus, there is provided a ratio changing mechanism between the converging lens and the CCD, and an aspect ratio which is optically determined through the converging lens is selectively varied by the ratio changing mechanism so as to substantially coincide with the aspect ratio of the CCD.

12 Claims, 16 Drawing Sheets

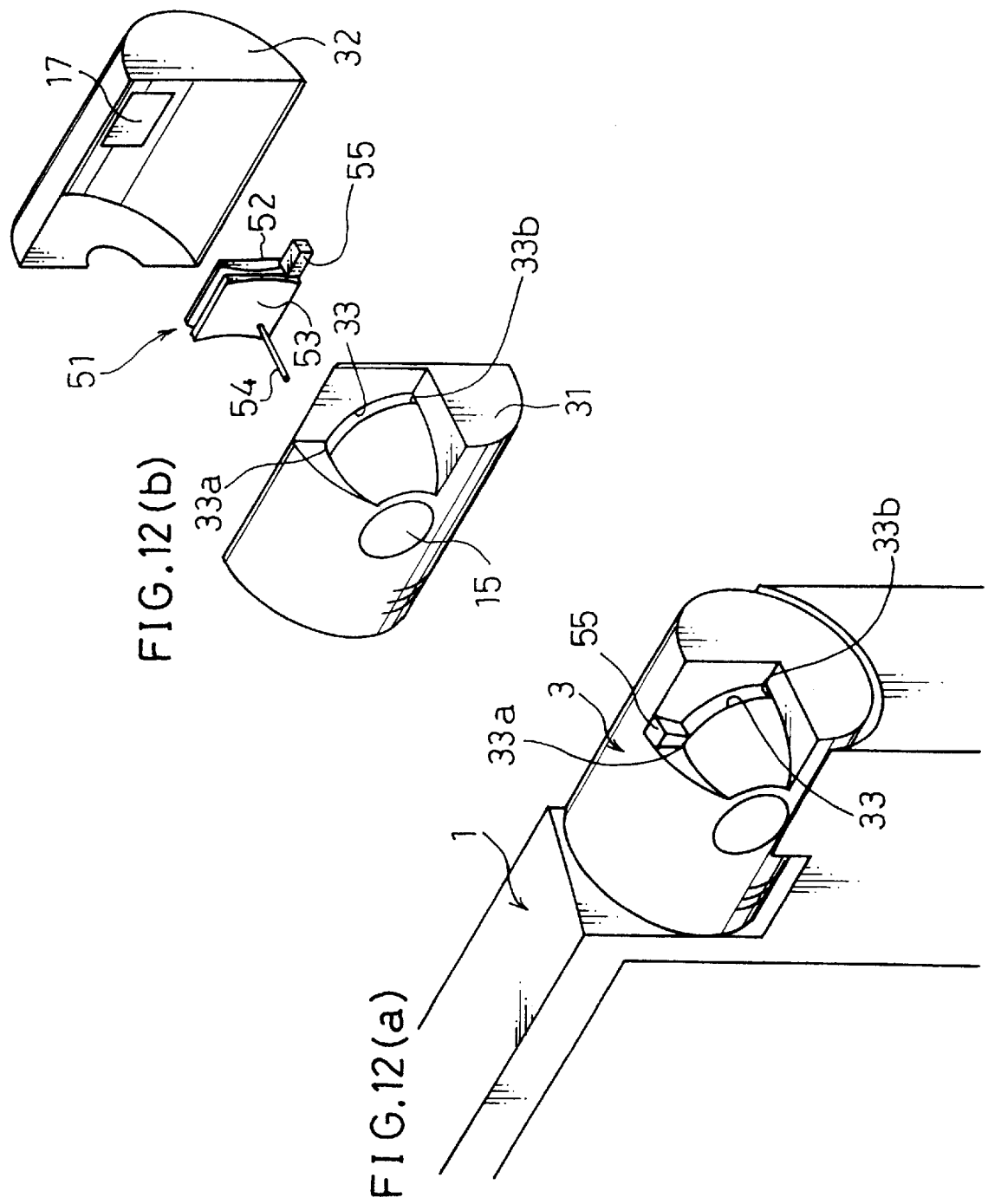

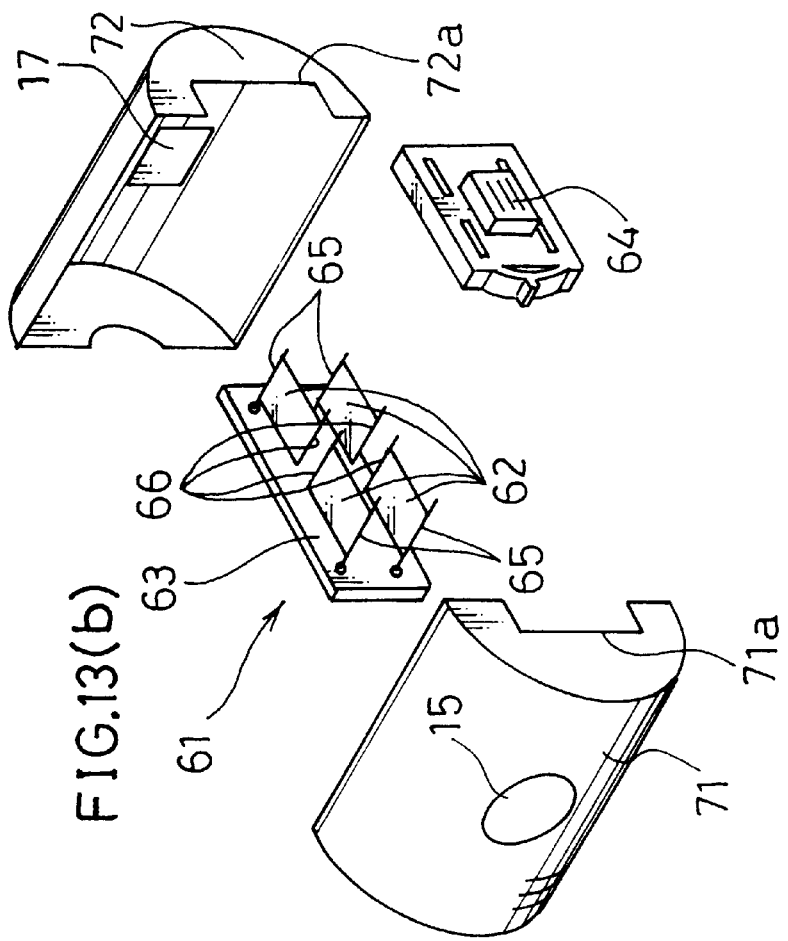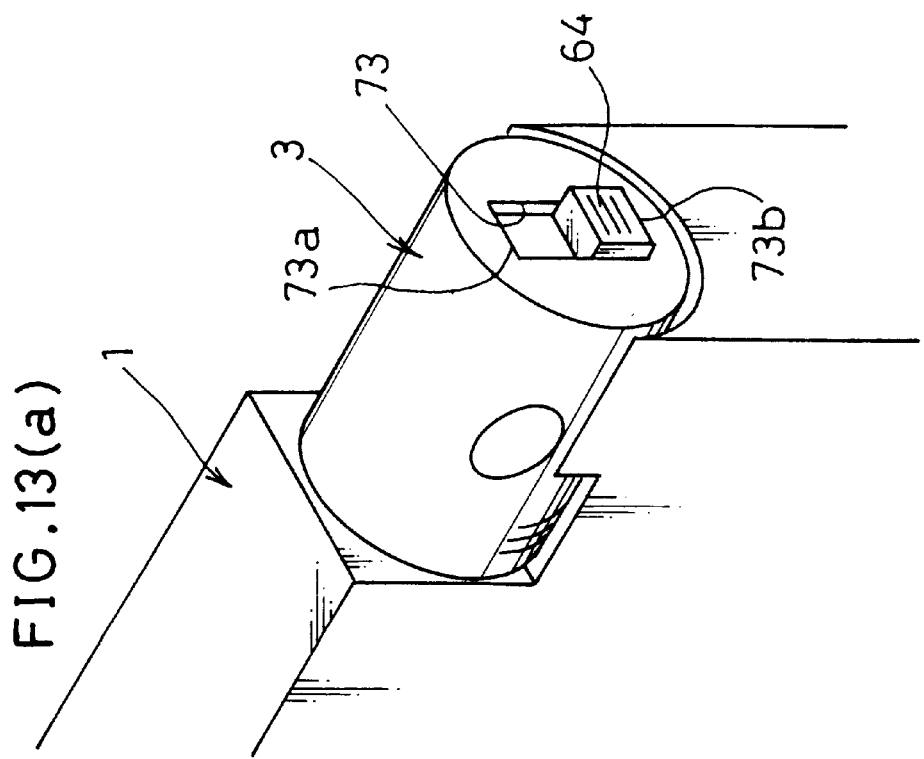

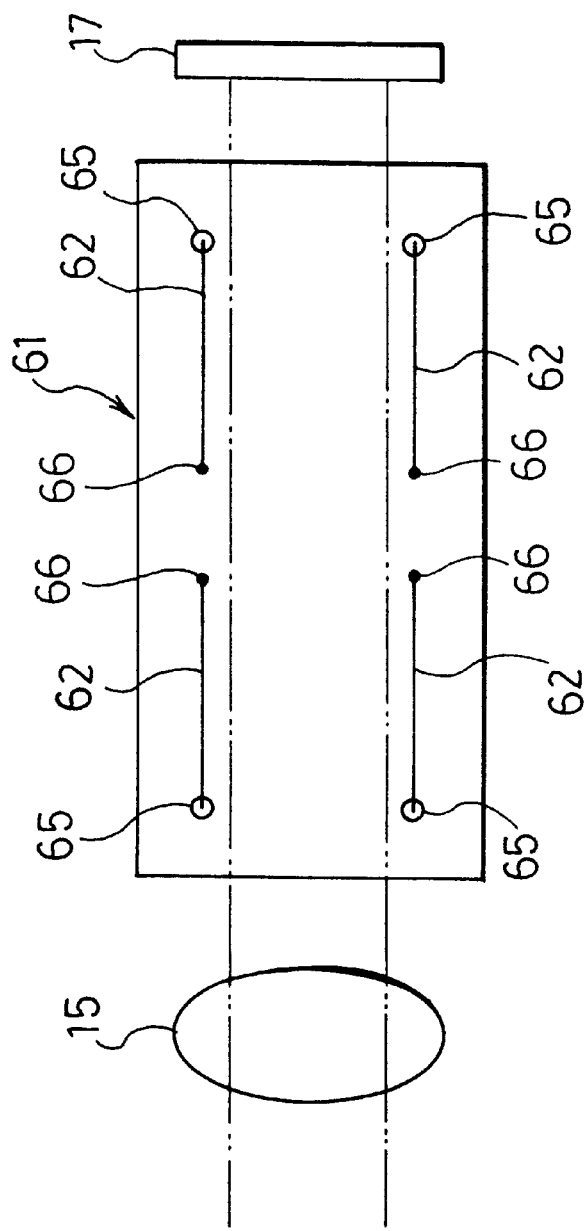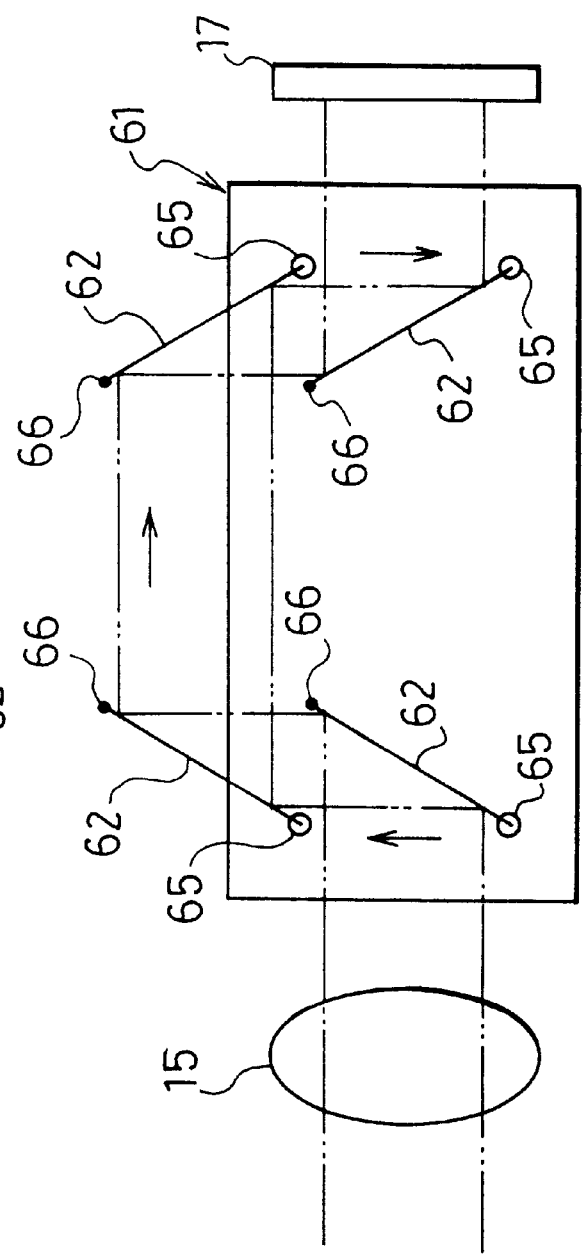
FIG.14(a)
FIG.14(b)

IMAGING APPARATUS INCLUDING DEVICE FOR A SELECTIVELY CHANGING ASPECT RATIOS

FIELD OF THE INVENTION

The present invention relates to imaging apparatuses such as digital electronic cameras including video cameras.

BACKGROUND OF THE INVENTION

Recently, to meet consumers' needs, imaging apparatuses which can be also adapted to a wide screen with an aspect ratio of 16:9 (a ratio in the vertical direction: a ratio in the horizontal direction) have been developed. Here, as a method for selectively obtaining an object image (image) in a current screen size with an aspect ratio of 4:3 and an object image (image) in a size of the wide screen, the Japanese Publication for Laid-Open Patent Application No. 5-252452/1993 (Tokukaihei No. 5-252452), for example, discloses a method as follows. A wide-screen-use CCD (charge coupled device) (aspect ratio: 16:9) is used in the method. In the case where an object image which is optically determined through a converging lens has an aspect ratio of 16:9, an overall imaging surface of the CCD. On the other hand, in the case where the aspect ratio of the object image has an aspect ratio of 4:3, the wide-screen-use CCD is adapted to a screen in the current screen size (aspect ratio: 4:3) by utilizing only an area with an aspect ratio of 4:3 in the center of the imaging surface of the CCD.

However, the above conventional method has a drawback in that image quality is degraded in the case where an object image with a certain aspect ratio is projected on the CCD having a different aspect ratio. The reason is as follows. In the case where the aspect ratio of the object image is different from the aspect ratio of the CCD, not all the elements of the CCD are used, and the number of effective elements decreases, compared with the case where all the elements of the CCD are utilized.

As a method for using all the elements of the CCD in the case where the object image in the current screen size which has been optically determined through the converging lens is projected on the wide-screen-use CCD, the Japanese Publication for Laid-Open Patent Application No. 5-316406/1993 (Tokukaihei No. 5-316406) discloses a method described below. In the arrangement of the above publication, light having entered through the converging lens is reflected by first reflecting means disposed in front of the converging lens, and the reflected light is again reflected by second reflecting means which has a focal distance different from that of the first reflecting means. By doing so, an object image in the current screen size is optically changed into an object image in the wide screen size so as to be suited for the wide-screen-use CCD.

However, the foregoing method of Tokukaihei 5-316406 is a method for projecting an object image in the current screen size onto the wide-screen-use CCD having more elements so that an image of higher quality is obtained, and object images (images) are obtained only in one screen size. Therefore, now demanded is an imaging apparatus which is capable of taking (imaging) object images in a plurality of screen sizes without decreasing the number of the effective elements in the CCD.

Besides, even though the conventional imaging apparatus is capable of storing object images in a plurality of screen sizes (for example, the wide screen size and the current screen size) in a form of image signals and reproducing them, the images are reproduced only in either of the screen sizes, in the case where the object images in the plural screen sizes are stored all together. Therefore, it is difficult to reproduce (display) each stored object image at its correct aspect ratio. In other words, it is difficult for the conventional imaging apparatus to reproduce an object image in the original screen size. Therefore, demanded is an imaging apparatus which is capable of, even though the object images in a plurality of screen sizes are stored, displaying each image at its correct aspect ratio.

Furthermore, in the case where a control panel such as application keys for controlling display of a display screen is displayed on the display screen when an object image imaged by the CCD is displayed on the display screen such as a display panel, the control panel is displayed always in a predetermined set area on the display surface. Therefore, there may occur drawbacks in that no images are displayed in some areas or the object images are displayed smaller than their intended sizes. For this reason, an imaging apparatus which is capable of efficiently carry out display without wasting spaces, in accordance with a required aspect ratio, is now demanded.

Furthermore, generally, in the case where an object before the user is to be taken, coverage widely ranges, and hence a microphone is required to catch sounds from a wide range. On the other hand, in the case where a vis-a-vis operation is carried out with the converging lens of the imaging apparatus directed toward the user, usually sounds may be caught only from the vicinity of the imaging apparatus.

However, as to the conventional imaging apparatus, no consideration is given to the directivities of the microphone with respect to sounds in the case of the normal operation with respect to objects in a relatively wider range and in the case of the vis-a-vis operation with respect to objects within a relatively short distance.

SUMMARY OF THE INVENTION

The object of the present invention is to provide an imaging apparatus having various enhanced performances as compared with the conventional imaging apparatuses.

To achieve the above object, an imaging apparatus of the present invention is characterized in comprising (1) a CCD having a predetermined aspect ratio, (2) a converging lens for projecting incident light onto the CCD, and (3) a ratio changing mechanism, provided between the converging lens and the CCD, for selectively changing an aspect ratio optically determined through the converging lens into an aspect ratio substantially coinciding with the aspect ratio of the CCD, so that the light having entered through the converging lens is projected all over an image surface of the CCD.

With the above arrangement, the light having entered through the converging lens can be projected substantially all over the imaging surface of the CCD, by selectively changing the aspect ratio optically determined through the converging lens into an aspect ratio substantially coinciding with the aspect ratio of the CCD. As a result, object images in a plurality of screen sizes can be imaged without a decrease in the number of effective elements of the CCD. Therefore, it is possible to provide an imaging apparatus superior in image display performances to conventional imaging apparatuses. Besides, in the case of the above imaging apparatus, the number of the effective elements of the CCD does not decrease, thereby resulting in that images in excellent image quality can be obtained.

Furthermore, to achieve the aforementioned object, another imaging apparatus of the present invention is characterized in comprising (1) a CCD for imaging an object image, rotatably provided so as to be capable of facing a direction in a normal state and an opposite direction to the direction in the normal state, (2) a microphone moving in an interlocked manner with rotation of the CCD, and (3) a sound recording direction switching section for switching a sound recording direction of the microphone in accordance with a direction which the CCD faces.

With the aforementioned arrangement, the sound recording direction can be switched in an interlocked manner with the rotation of the CCD, and hence, the directivity of the microphone can be switched in accordance with the direction which the CCD faces. Therefore, the imaging apparatus is capable of performing sound recording operations suitable for the normal operation with respect to objects in a relatively wide range and the vis-a-vis operation with respect to objects in a relatively short distance, respectively. As a result, it is possible to provide an imaging apparatus superior in sound recording performances to conventional imaging apparatuses. In the imaging apparatus of the present invention, it is possible to switch the directivity of the microphone to the non-directivity during the normal operation, or to the directivity in a single specific direction during the vis-a-vis operation.

For a fuller understanding of the nature and advantages of the invention, reference should be made to the ensuing detailed description taken in conjunction with the accompanying drawings.

BRIEF DESCRIPTION OF THE DRAWINGS

FIG. 12(a) is a perspective view illustrating an arrangement of a camera unit having the ratio changing mechanism shown in FIG. 11.

FIG. 12(b) is a perspective view illustrating parts of the camera unit of FIG. 12(a).

FIG. 13(a) is a perspective view illustrating an arrangement of a camera unit provided in an imaging apparatus in accordance with still another embodiment of the present invention.

FIG. 13(b) is a perspective view illustrating parts of the camera unit of FIG. 13(a).

FIG. 14(a) is a view explaining a method for changing an aspect ratio when the wide vision mode is selected, with the use of a ratio changing mechanism provided in the camera unit shown in FIGS. 13(a) and 13(b)

FIG. 14(b) is a view explaining a method for changing an aspect ratio when the normal mode is selected, with the use of the ratio changing mechanism provided in the camera unit shown in FIGS. 13(a) and 13(b).

DESCRIPTION OF THE PREFERRED EMBODIMENTS

The following description will explain an embodiment of the present invention, while referring to FIGS. 1 through 10.

Figure 3:
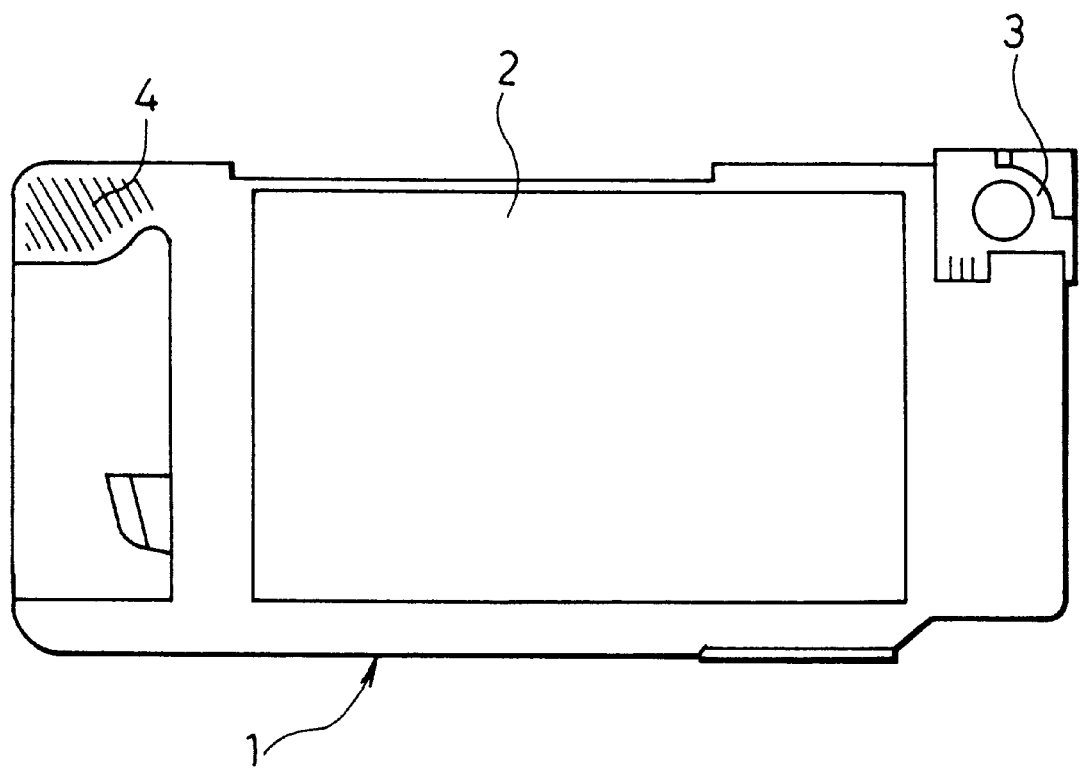
FIG. 3 is a view of an outward appearance of the imaging apparatus, illustrating a schematic arrangement thereof.

As shown in FIG. 3, an imaging apparatus in accordance with the present embodiment is composed of a main body cabinet unit 1 equipped with an input-output unit 2, a camera unit 3, and a speaker unit 4.

Figure 2:
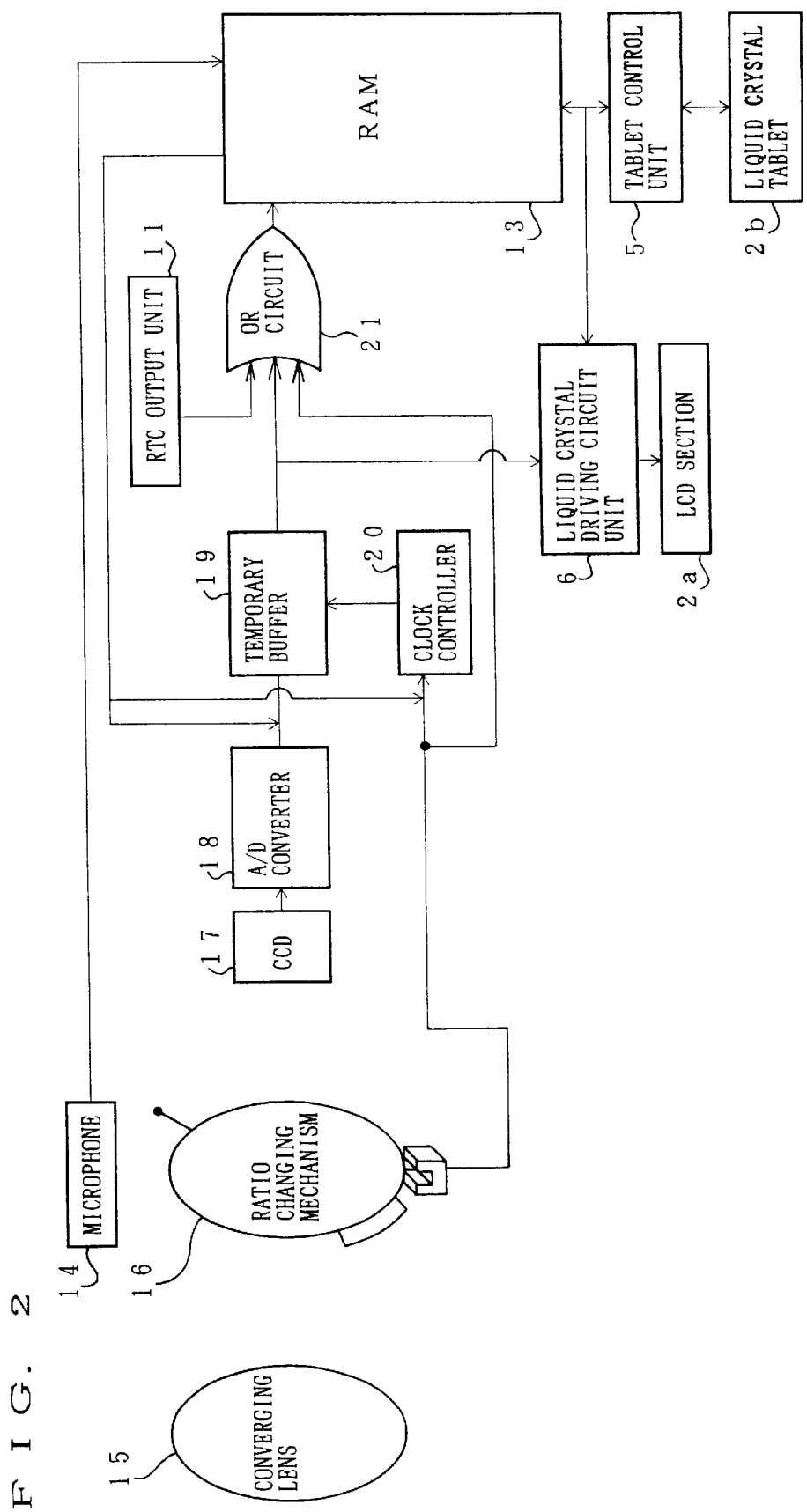
FIG. 2 is an explanatory view illustrating an actual operation with the use of the imaging apparatus.

In the camera unit 3, as shown in FIG. 2, there are installed a CCD 17 as imaging means for imaging an object image, a converging lens 15 as projecting means for projecting incident light onto the CCD 17, a ratio changing mechanism 16 as aspect ratio changing mechanism for selectively changing an aspect ratio determined by the optical system (that is, an aspect ratio optically determined through the converging lens 15) so that it comes to substantially coincide with an aspect ratio of the CCD 17 so that the light having entered through the converging lens 15 is projected all over an image surface of the CCD 17, and a microphone 14 as sound recording means for taking in sounds from outside.

The input-output unit 2 is arranged so as to display the object image which has been taken by the camera unit 3. The speaker unit 4 is arranged so as to output sound data which have been taken in by the microphone 14 of the camera unit 3, and sound data stored in the main body cabinet unit 1. Note that an arrangement of the camera unit 3 will be described in detail later.

Figure 1:
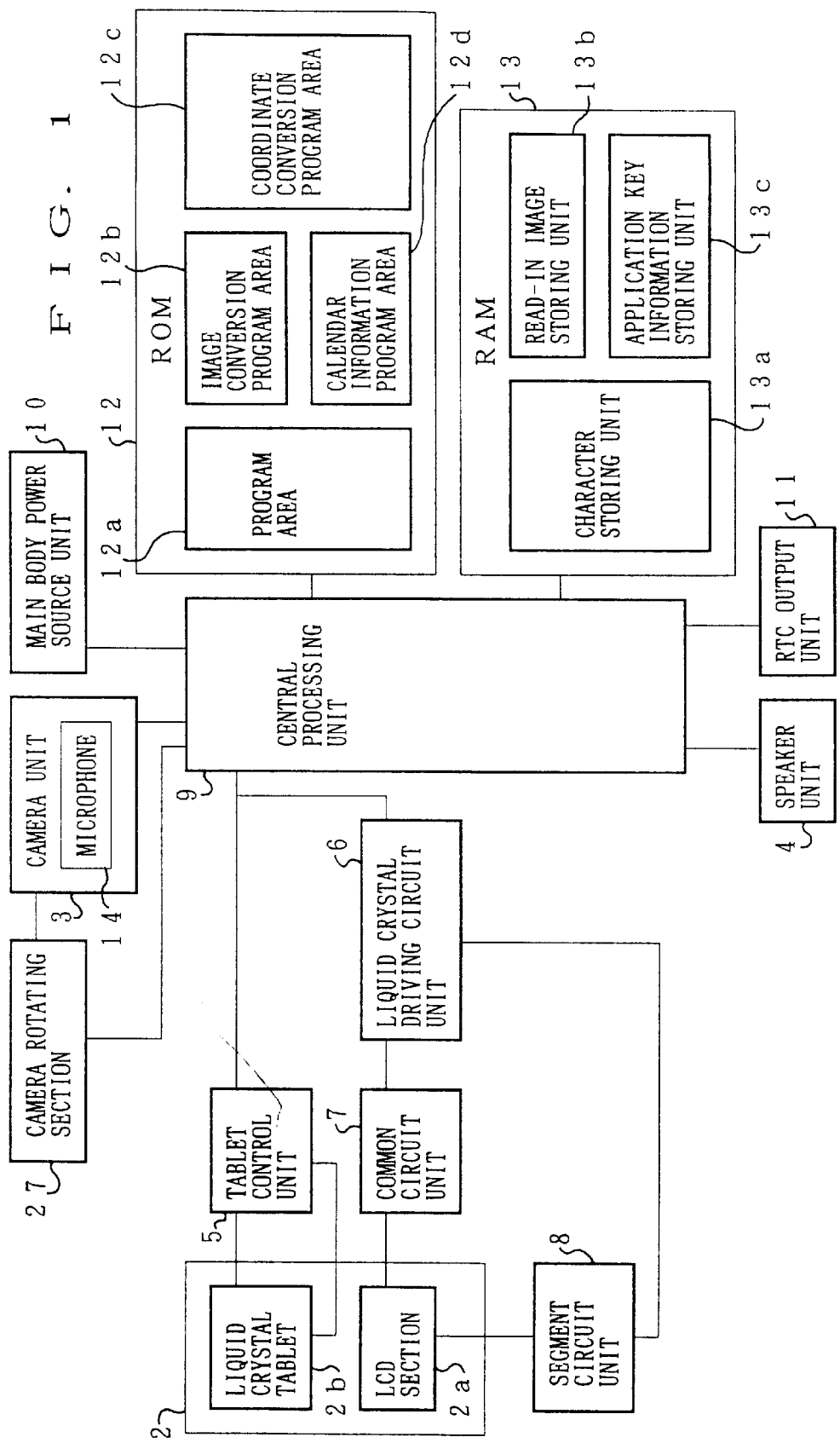
FIG. 1 is a block diagram illustrating an arrangement of an imaging apparatus in accordance with an embodiment of the present invention.

The main body cabinet unit 1 is used as a case for the imaging apparatus of the present embodiment. The main body cabinet unit 1 contains the input-output unit 2, a tablet control unit 5, a liquid crystal driving circuit unit 6, a common circuit unit 7, a segment circuit unit 8, a central processing unit 9, a main body power source unit 10, an RTC (rewritable consumer time code) output unit 11, a ROM 12, a RAM 13, an infrared communication unit (not shown), and an interface (not shown), as illustrated in FIG. 1. Besides, on an outer surface of the main body cabinet unit 1, there are provided a power source switch (not shown), a pen holding unit (not shown) for holding an input pen (not shown) with whose touch with respect to the input-output unit 2, information is inputted or selected.

Figure 4:
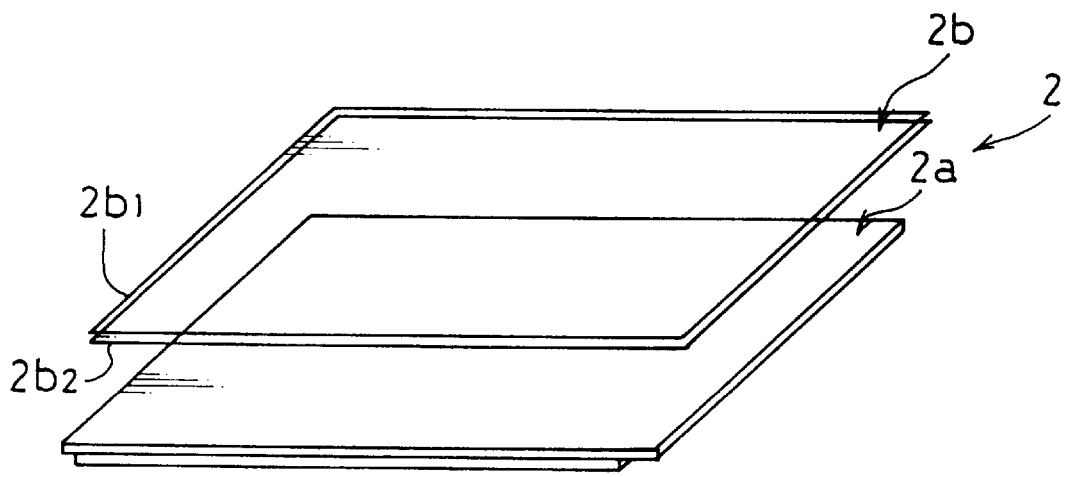
FIG. 4 is a view illustrating a schematic arrangement of an input-output unit of the imaging apparatus.

As shown in FIG. 4, the input-output unit 2 is composed of (1) a liquid crystal display (LCD) section $2a$ in a matrix form which is thin and capable of displaying characters and others, and (2) a liquid crystal tablet $2b$ having a size enough to cover the LCD section $2a$. The LCD section $2a$ and the liquid crystal tablet $2b$ are integrally provided.

The liquid crystal tablet $2b$ has, for example, a pair of transparent sheets $2b_1$ and $2b_2$. On a surface of the sheet $2b_1$ facing the sheet $2b_2$ and a surface of the sheet $2b_2$ facing the sheet $2b_1$, transparent electrodes (not shown) are provided, while spacers (not shown) in a protuberance form are regularly provided between the vis-a-vis surfaces.

Thus, the transparent electrodes which are provided on the sheets $2b_1$ and $2b_2$ so as to face each other are not in contact in a normal state, but, when a certain portion is indicated (pressed) by a finger or a pen, electrodes at the indicated portion come into contact. With this arrangement, when a point on the liquid crystal tablet $2b$ is indicated by a finger or a pen, a coordinate of the indicated point is detected with the use of the tablet control unit 5 connected with each transparent electrode.

In other words, the tablet control unit 5 is arranged so as to pick up coordinate information from the liquid crystal tablet $2b$. Then, by superimposing position information of the displayed content displayed by the LCD section $2a$ onto the coordinate information of the liquid crystal tablet $2b$, the tablet control unit 5 is allowed to recognize the displayed content selected by the user in the LCD section $2a$, with the use of the coordinate indicated in the liquid crystal tablet $2b$.

The liquid crystal driving circuit unit 6 stores dot positions where liquid crystal is turned on, in a bit map form. When necessary, the liquid crystal driving circuit unit 6 sends signals to the common circuit unit 7 and the segment circuit unit 8 so as to cause the LCD section $2a$ to display.

To be more specific, the liquid crystal tablet $2b$ is connected to the central processing unit 9 via the tablet control unit 5, as illustrated in FIG. 1. The LCD section $2a$ is connected to the central processing unit 9 via the common circuit unit 7 or the segment circuit unit 8, and the liquid crystal driving circuit unit 6.

Furthermore, the central processing unit 9 is connected with the camera unit 3, the speaker unit 4, the main body power source unit 10, the RTC output unit 11, a camera rotating section 27, and the ROM 12 and the RAM 13 as memory means. The central processing unit 9 outputs various types of orders so as to control input information and output information.

Here, the main body power source unit 10 is a power supplying source for supplying power to parts necessitating power, such as the central processing unit 9, and is connected with the power switch (not shown) on the outer surface of the main body cabinet unit 1.

The RTC output unit 11 measures time with the use of a clock signal (not shown) and outputs an RTC indicating the date and the hour.

Besides, the camera rotating section 27 causes the camera unit 3 to rotate when imaging, thereby enabling both (1) the normal operation wherein a scene in front of the user which relatively widely ranges is imaged as an object (object to be imaged) and (2) the vis-a-vis operation wherein things in a relatively short distance are imaged as an object (object to be imaged) with the converging lens 15 directed to the user.

In the ROM 12, there are provided (1) a program area $12a$ for storing a program for operations of the central processing unit 9, (2) an image conversion program area $12b$ for storing a program for converting an image signal supplied from the CCD 17 into image information to be displayed in the LCD section $2a$, (3) a coordinate conversion program area $12c$ for storing a program for converting a display coordinate of the image information into those corresponding to a coordinate detected by the tablet control unit 5, (4) a calendar information program area $12d$ for storing a program for calculating the date, and the like.

In the RAM 13, there are provided (1) a character storing unit $13a$ for storing character information such as sentences inputted through the input-output unit 2 by the user, (2) a read-in image storing unit $13b$ for storing an object image taken by the camera unit 3 in the form of an image signal, (3) an application key information storing unit $13c$ for storing information on an application key, and the like.

The RAM 13 also stores sound data supplied from the microphone 14 in the camera unit 3, as illustrated in FIG. 2.

The following description will explain an imaging operation by the use of the imaging apparatus as described above. When light enters the converging lens 15, an aspect ratio determined by the optical system is changed by the ratio changing mechanism 16, as illustrated in FIG. 2, and an object image is projected on the image surface of the CCD 17. Note that a correction lens (not shown) is provided between the converging lens 15 and the ratio changing mechanism 16 so as to adjust a focus before photoelectric conversion at the CCD 17.

Subsequently, at the CCD 17, the light projected by the converging lens 15 through the ratio changing mechanism 16 is subjected to photoelectric conversion, and is converged into an image signal as an electric signal, and the electric signal is supplied to an A/D (analog-to-digital) converter 18. The image signal which has been converted into a digital signal by the A/D converter 18 is temporarily stored in a temporary buffer 19, and is sent to an OR circuit 21 at a transfer rate determined by a clock controller 20 as output rate switching means.

Then, a date data supplied from the RTC output unit 11, a data on the aspect ratio determined by the optical system, and the image data (image signal) supplied from the temporary buffer 19 are synthesized at the OR circuit 21, and a resultant data of the synthesis is stored in the RAM 13.

In this case, the object image taken by the camera unit 3 by the user is stored as an image data (image signal) in the read-in image storing unit $13b$ in the RAM 13.

Figure 5:
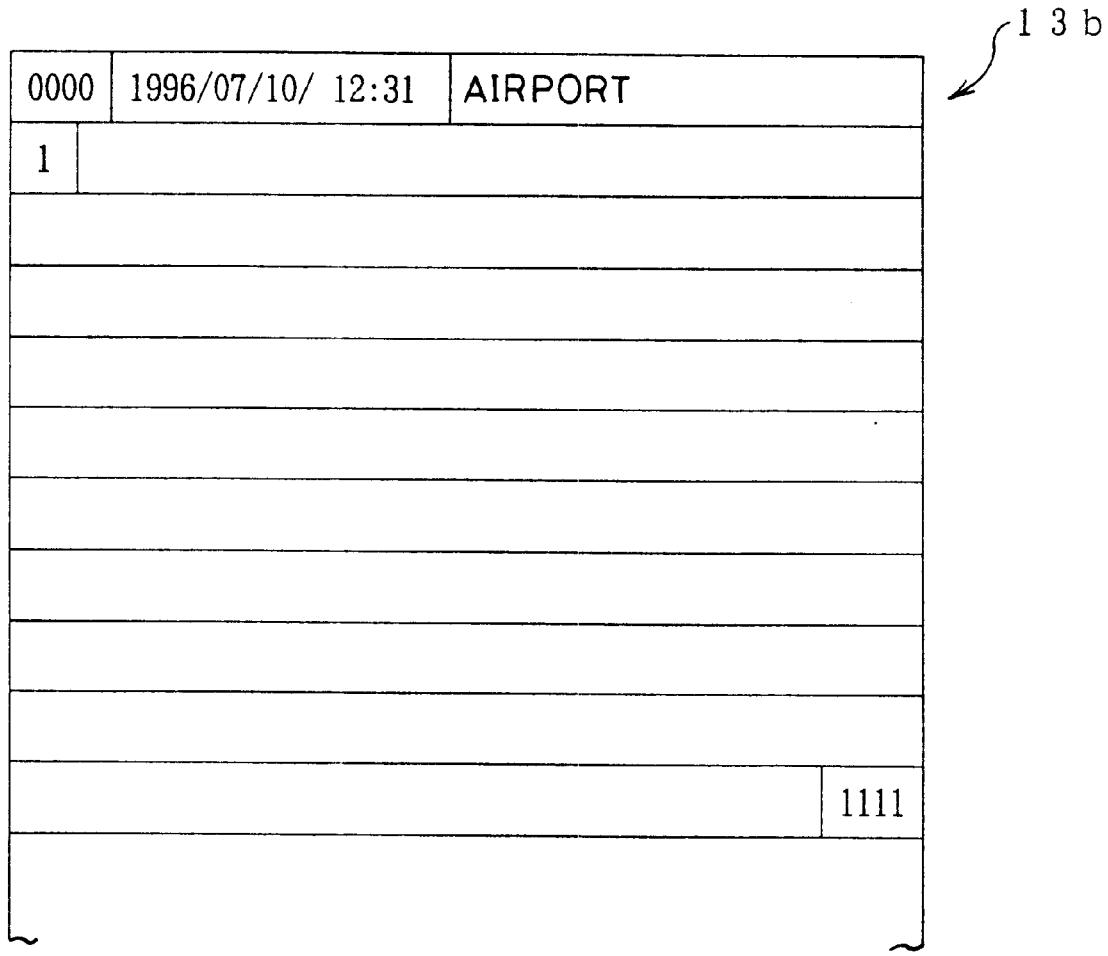
FIG. 5 is an explanatory view of a read-in image storing section in a RAM provided in the imaging apparatus.
Figure 6:
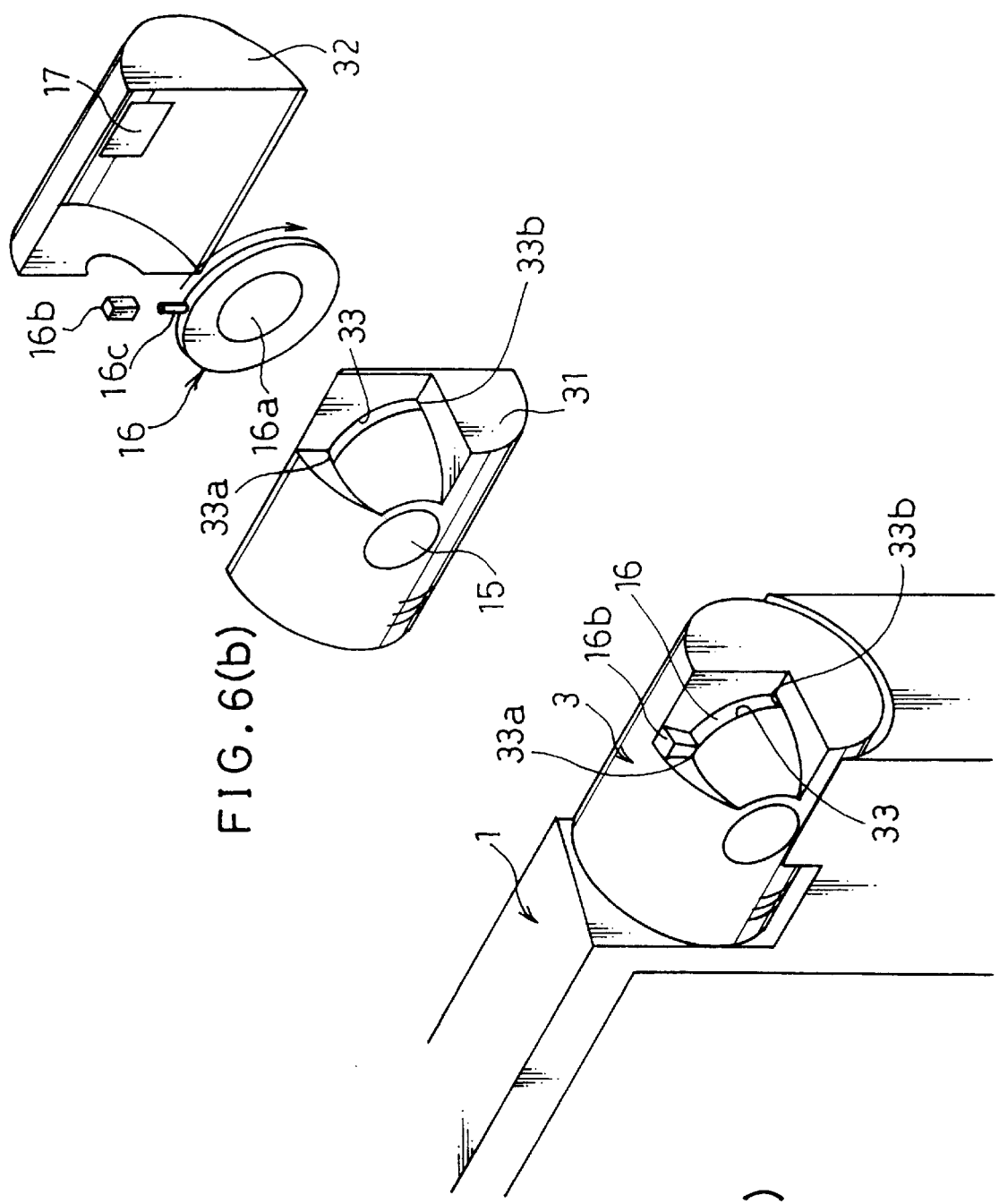
FIG. 6(a) is a perspective view illustrating an arrangement of a camera unit in the imaging apparatus.
FIG. 6(b) is a perspective view illustrating parts of the camera unit of FIG. 6(a).

In the read-in image storing unit $13b$, as shown in FIG. 5, the following are stored with respect to every image data: a start code "0000" representing a starting point of a storing portion which stores one image data, a date on which the object image is taken (for example, 1996/07/10 12:31); a title (for example, "AIRPORT"); a code number (for example, "1") representing an aspect ratio determined by the optical system; the image data; and an end code "1111" representing an ending point of the storing portion for the image data.

Here, in the read-in image storing unit 13b shown in FIG. 5, "1" which shows that the aspect ratio is 16:9 is inputted as the code number representing an aspect ratio selected by the user, that is, an aspect ratio determined by the optical system. Note that in the case where the aspect ratio is 4:3, "0" is inputted.

In other words, the imaging apparatus of the present embodiment is arranged so that, when an object image taken by the camera unit 3 is stored in the RAM 13, an aspect ratio recognition signal for use in recognizing the aspect ratio is stored as the code number together with the object image. And, the clock controller 20 is arranged so as to switch the output rate for outputting the image signal stored in the RAM 13 from a high rate to a low rate or vice versa, in accordance with the aspect ratio recognition signal stored together with the image signal.

Furthermore, when the object image is displayed on the LCD section 2a, the data stored in the RAM 13 is displayed as image information on the LCD section 2a through the liquid crystal driving circuit unit 6 (control panel display means) as illustrated in FIG. 1. At the same time, application key information suitable for the aspect ratio of the liquid crystal tablet 2b is read by the tablet control unit 5 (control panel display means) from the application key information storing unit 13c of the RAM 13, and the application key information is arranged in the liquid crystal tablet 2b so as to form a control panel.

Here, the following description will explain in detail a structure of the camera unit 3 and an aspect ratio changing method, while referring to FIGS. 6(a) through 8.

In the present embodiment, the camera unit 3 is equipped with the converging lens 15, the ratio changing mechanism 16, the CCD 17, a front camera cover 31, a rear camera cover 32, and the like, as illustrated in FIG. 6(b). The ratio changing mechanism 16 has (1) a ratio changing lens 16a as a refractive index changing lens which has a different refractive index depending on a direction of an axis of the lens, and (2) a lever 16b as aspect ratio selecting means, which rotates the ratio changing lens 16, and by doing so, selects one desired aspect ratio among a plurality of aspect ratios. In the following description, a lens which has different refractive indexes in a horizontal direction and a perpendicular direction respectively is used as the ratio changing lens 16a.

The lever 16b is fixed on a side surface of the ratio changing lens 16a, by, for example, a pin 16c. Note that the method for fixing the lever 16b is not particularly specified, but may be fixed with the use of a screw or adhesive.

On the front camera cover 31, the converging lens 15 is disposed, and an aperture section 33 is formed thereon in a substantially arc shape along a curve of a side surface of the ratio changing lens 16a, at a position where the ratio changing mechanism 16 is installed. On the other hand, on the rear camera cover 32, at a position where an optical axis of the converging lens 15 and the ratio changing lens 16a falls on, the CCD 17 is installed. The ratio changing mechanism 16 is provided between the converging lens 15 and the CCD 17 so that the lever 16 protrudes through the aperture section 33, as illustrated in FIG. 6(a).

The imaging apparatus of the present embodiment is arranged so that a movement of the lever 16a in he aperture section 33 causes the ratio changing lens 16a to rotate, thereby enabling selection and change of an aspect ratio.

For example, the imaging apparatus shifts to the wide vision mode with the aspect ratio of 16:9 in the case where the lever 16b is positioned at an upper end 33a of the aperture section 33, whereas it shifts to the normal mode with the aspect ratio of 4:3 in the case where the lever 16b is moved in an arrow direction shown in FIG. 6(b), to a lower end 33b of the aperture section 33. In the present embodiment, the CCD 17 with an aspect ratio of 16:9 is used in a size with an aspect ratio of 3:2.

Figure 7:
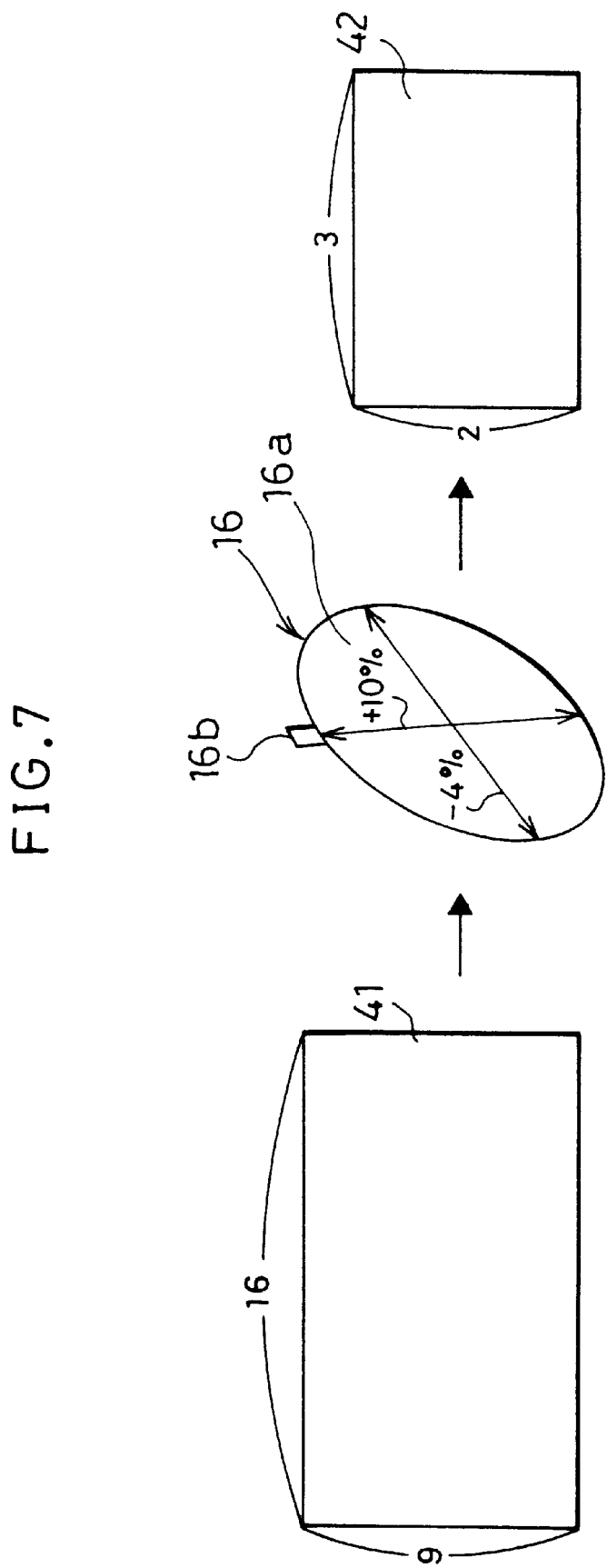
FIG. 7 is a view explaining a method for varying an aspect ratio optically determined, with the use of a ratio changing mechanism provided in the camera unit.

To be more specific, in the case where the user uses the imaging apparatus in the wide vision mode, by setting a refractive index of the ratio changing lens 16a in the vertical direction to +10 percent while setting a refractive index thereof in the horizontal direction to −4 percent as illustrated in FIG. 7, the aspect ratio (16:9) of an object image 41 which has been determined by the optical system is changed by the ratio changing lens 16a as follows:

$$16 \times 0.96 : 9 \times 1.1 = 15.36 : 9.9 \approx 3:2$$

By doing so, the object image 41 with an aspect ratio of 16:9 becomes an object image 42 with an aspect ratio of 3:2 which is projected substantially all over the image surface of the CCD 17 with the aspect ratio of 3:2.

Figure 8:
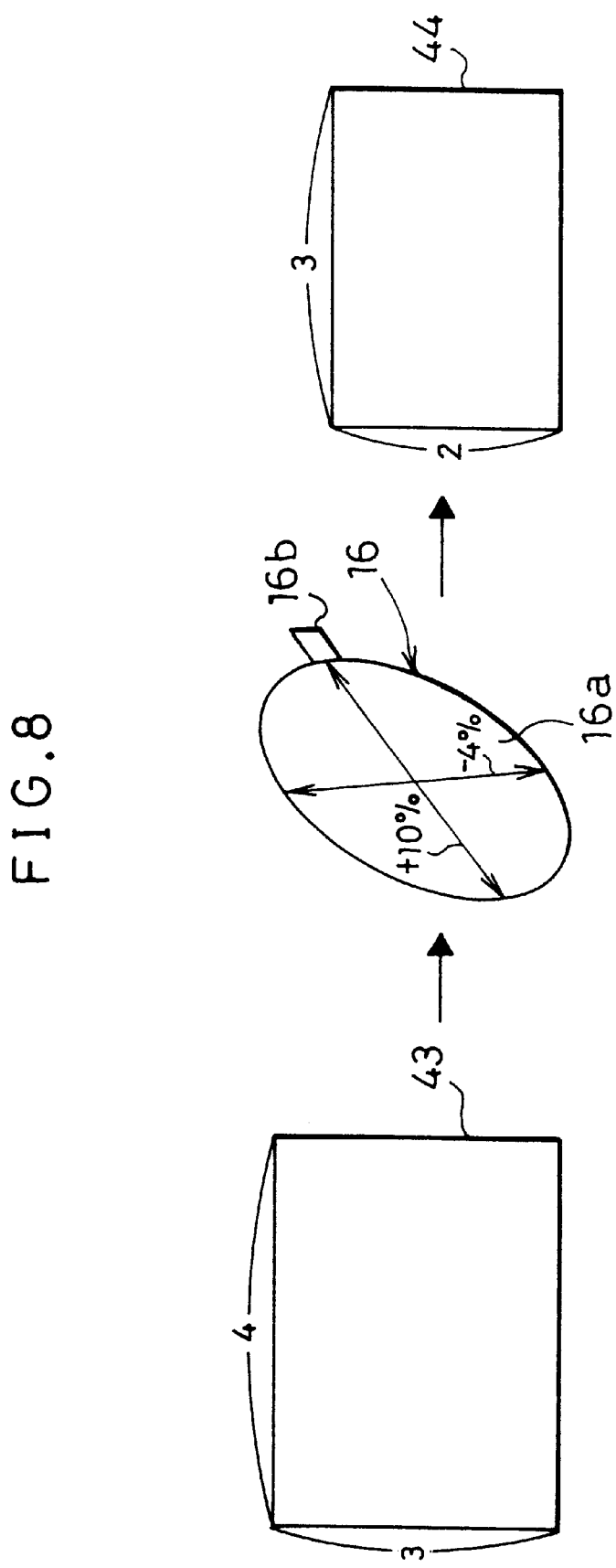
FIG. 8 is a view explaining a method for varying an aspect ratio optically determined, with the use of a ratio changing mechanism provided in the camera unit.

In the case where the user uses the imaging apparatus in the normal mode, by setting a refractive index of the ratio changing lens 16a in the vertical direction to −4 percent while setting a refractive index thereof in the horizontal direction to +10 percent as illustrated in FIG. 8, the aspect ratio (4:3) of an object image 43 which has been determined by the optical system is changed by the ratio changing lens 16a as follows:

$$4 \times 1.1 : 3 \times 0.96 = 4.4 : 2.88 \approx 3:2$$

By doing so, the object image 43 with an aspect ratio of 4:3 becomes an object image 44 with an aspect ratio of 3:2 which is projected substantially all over the image surface of the CCD 17 with the aspect ratio of 3:2.

The refractive index of the ratio changing lens 16a can be easily changed by various methods such as (1) a method wherein the ratio changing lens 16a is made to have a warp, or (2) a method wherein the surface of the ratio changing lens 16a is made to have a concave or a convex, and (3) a method wherein a thickness of the ratio changing lens 16a is partially varied.

Thus, with this arrangement of the present embodiment wherein the ratio changing mechanism 16 is provided as the aspect ratio changing means between the converging lens 15 and the CCD 17 as the imaging means, the aspect ratio which is optically determined through the converging lens 15 can be selectively changed so as to substantially coincide with the aspect ratio of the CCD 17, so that the light having entered through the converging lens 15 is projected all over the image surface of the CCD 17.

As a result, the imaging apparatus of the present embodiment is capable of taking object images in a plurality of screen sizes, without a decrease in the number of the effective elements of the CCD 17. Therefore, by using the above-described imaging apparatus, object images with different aspect ratios can be selectively obtained with high image quality. Thus, the imaging apparatus of the present embodiment has superior display performance to the conventional ones.

Figure 9A:
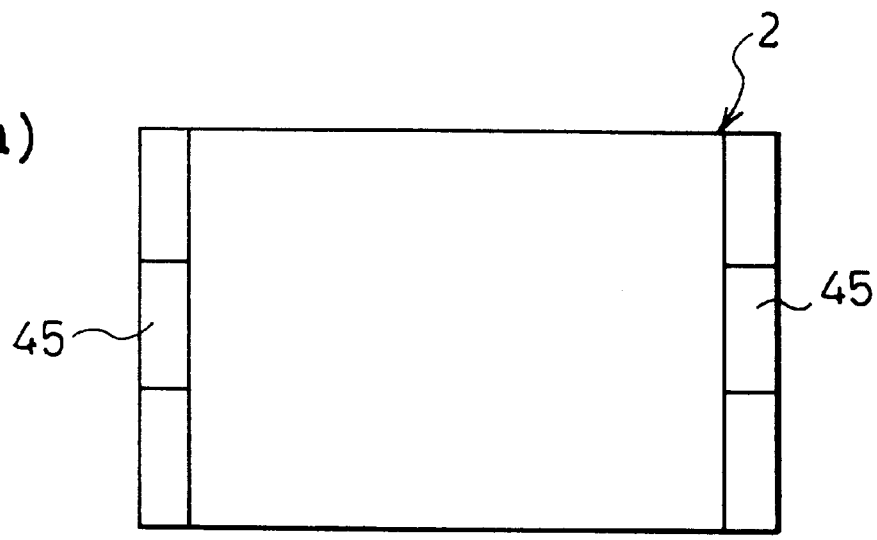
FIG. 9(a) is a view explaining a display method applicable to a display screen of the input-output unit of the imaging apparatus when a normal mode is selected.
Figure 9B:
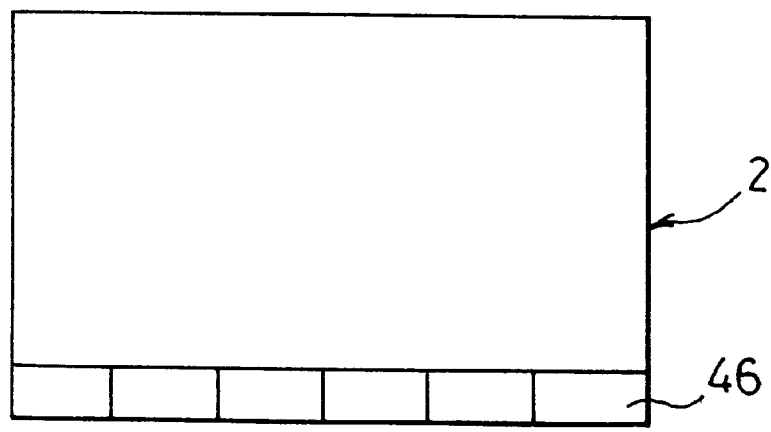
FIG. 9(b) is a view explaining a display method applicable to a display screen of the input-output unit of the imaging apparatus when a wide vision mode is selected.

The following description will explain an operation for causing the input-output unit 2 to display the object image which has been taken by the camera unit 3, while referring to FIGS. 9(a) and 9(b).

FIG. 9(a) shows how display is carried out on the display screen in the case where the input-output unit 2 performs display in the normal mode with an aspect ratio of 4:3. On the other hand, FIG. 9(b) shows how display is carried out on the display screen in the case where the input-output unit 2 performs display in the wide vision mode with an aspect ratio of 16:9.

When the input-output unit 2 is caused to display as image information an object image which has been taken by the camera unit 3, the following occurs: a display of the object image which has been taken in the wide vision mode is more condensed than a display of the image which has been taken in the normal mode, in the case where they are displayed at the same transfer rate.

Therefore, to achieve uniformity in displays, the imaging apparatus of the present embodiment is arranged so that either a high transfer rate or a low transfer rate is selected in accordance with the aspect ratio determined by the optical system. More specifically, in the imaging apparatus of the present embodiment, either the high transfer rate or the low transfer rate is selected in accordance with the code number representing the aspect ratio, which is stored in the read-in image storing unit 13b of the RAM 13.

To be more specific, the imaging apparatus of the present embodiment is arranged so that a clock rate is set to a low rate in the case of the wide vision mode (that is, in the case where a display in the wide screen size is performed), while the clock rate is set to a high rate in the case of the normal mode (that is, in the case where a display in the current screen size is performed). By doing so, the display operation is carried out by switching from the wide vision mode to the normal mode or vice versa.

Thus, in the imaging apparatus of the present embodiment, together with the aspect ratio recognition signal with which the aspect ratio selected by the lever 16b as the aspect ratio selecting means is identified, the object image imaged by the CCD 17 as the imaging means is stored in the form of the image signal, in the RAM 13 as the memory means. Then, when the image signal stored in the RAM 13 is outputted and displayed as object image in the input-output unit 2, the output rate at which the image signal stored in the RAM 13 is outputted is switched by the clock controller 20 as the output rate switching means, in accordance with the aspect ratio recognition signal stored together with the image signal.

By doing so, even in the case where object images in a plurality of screen sizes are stored, the imaging apparatus of the present embodiment is capable of performing reproduction (display) at an aspect ratio selected by the lever 16b, and is capable of realizing a good and accurate display, not causing any display to be condensed even in the case where object images with different aspect ratios respectively are displayed.

Besides, the imaging apparatus of the present embodiment is arranged so that in the normal mode with the aspect ratio of 4:3, an application key 45 is displayed in right and/or left edge areas of the display screen, which are spare areas of the input-output unit 2 (that is, areas in which the object image is not displayed since the image is displayed so that the aspect ratio is 4:3).

On the other hand, in the case of the wide vision mode with the aspect ratio of 16:9, an application key 46 is displayed in a bottom edge area of the display screen, which is a spare area of the input-output unit 2 (that is, an area in which the object image is not displayed since the image is displayed so that the aspect ratio is 16:9).

Figure 10:
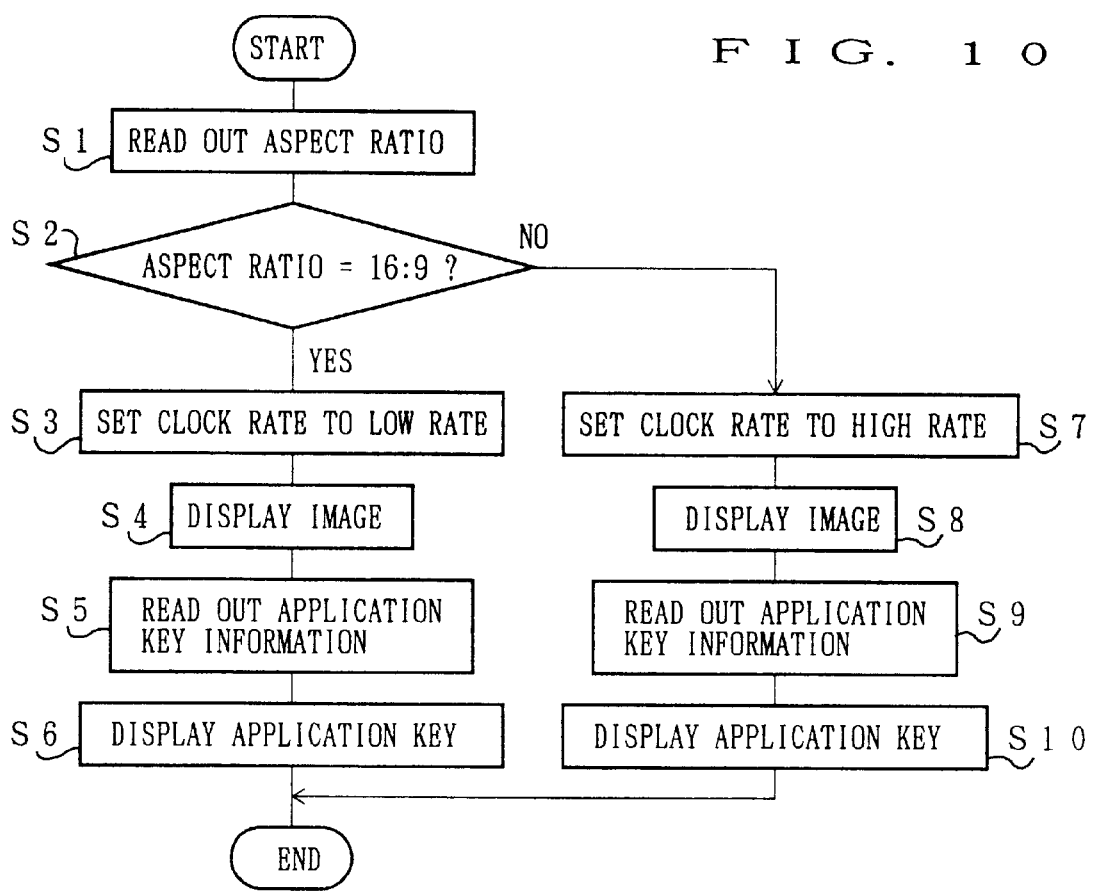
FIG. 10 is a flowchart of an process for causing the input-output unit to display an image taken by the camera unit of the imaging apparatus.

The following description will explain an operation procedure for causing the input-output unit 2 to display an object image (image) taken by the camera unit 3, while referring to a flowchart shown in FIG. 10.

In response to an order for causing the object image taken by the camera unit 3 to be displayed by the input-output unit 2, the central processing unit 9 reads out an aspect ratio of the object image to be displayed (Si), and judges whether or not the aspect ratio is 16:9 (S2).

In the case where the central processing unit 9 judges that the aspect ratio thus read out at S2 is 16:9, the clock rate is set to the low rate by the clock controller 20 (S3) Subsequently, the central processing unit 9 causes the image signal (image data) stored in the RAM 13 to be displayed as image information (image) in the LCD section 2a through the liquid crystal driving circuit unit 6, at the transfer rate thus set by the clock controller 20 (S4). Furthermore, application key information suitable for the aspect ratio of the liquid crystal tablet 2b is read from the application key information storing unit 13c of the RAM 13 through the tablet control unit 5 (S5), and the application key 46 is displayed in the bottom edge area of the display screen of the input-output unit 2 (S6), as illustrated in FIG. 9(b).

On the other hand, in the case where at S2 the central processing unit 9 judges that the aspect ratio is not 16:9, the clock rate is set to the high rate by the clock controller 20 (S7). Subsequently, the central processing unit 9 causes the image signal (image data) stored in the RAM 13 to be displayed as image information (image) in the LCD section 2a through the liquid crystal driving circuit unit 6, at the transfer rate thus set by the clock controller 20 (S8). Furthermore, application key information suitable for the aspect ratio of the liquid crystal tablet 2b is read from the application key information storing unit 13c of the RAM 13 through the tablet control unit 5 (S9), and the application key 45 is displayed in the left and/or right edge areas of the display screen of the input-output unit 2 (S10), as illustrated in FIG. 9(a). Through the procedure described above, display in accordance with an aspect ratio, effectively utilizing space of the display screen, is performed.

In other words, the imaging apparatus of the present embodiment is arranged so that, when an image signal stored in the RAM 13 as the memory means is outputted and displayed as an object image in the input-output unit 2, (1) the application key (for example, the application key 45 or 46) is displayed as the control panel for controlling the display on the display screen, on the display screen of the input-output unit 2 for displaying the object image, by the liquid crystal driving circuit unit 6 and the tablet control unit 5 as the control panel displaying means, and at the same time, (2) a position at which the application key is displayed is switched in accordance with the aspect ratio recognition signal stored together with the image signal.

Therefore, in the case where the imaging apparatus of the present embodiment is used, such problems as wasteful use of spaces by displaying nothing therein or displaying the object image in a smaller size do not occur, and display is efficiently carried out in accordance with the aspect ratio. As a result, excellent display is realized.

Second Embodiment

Figure 11:
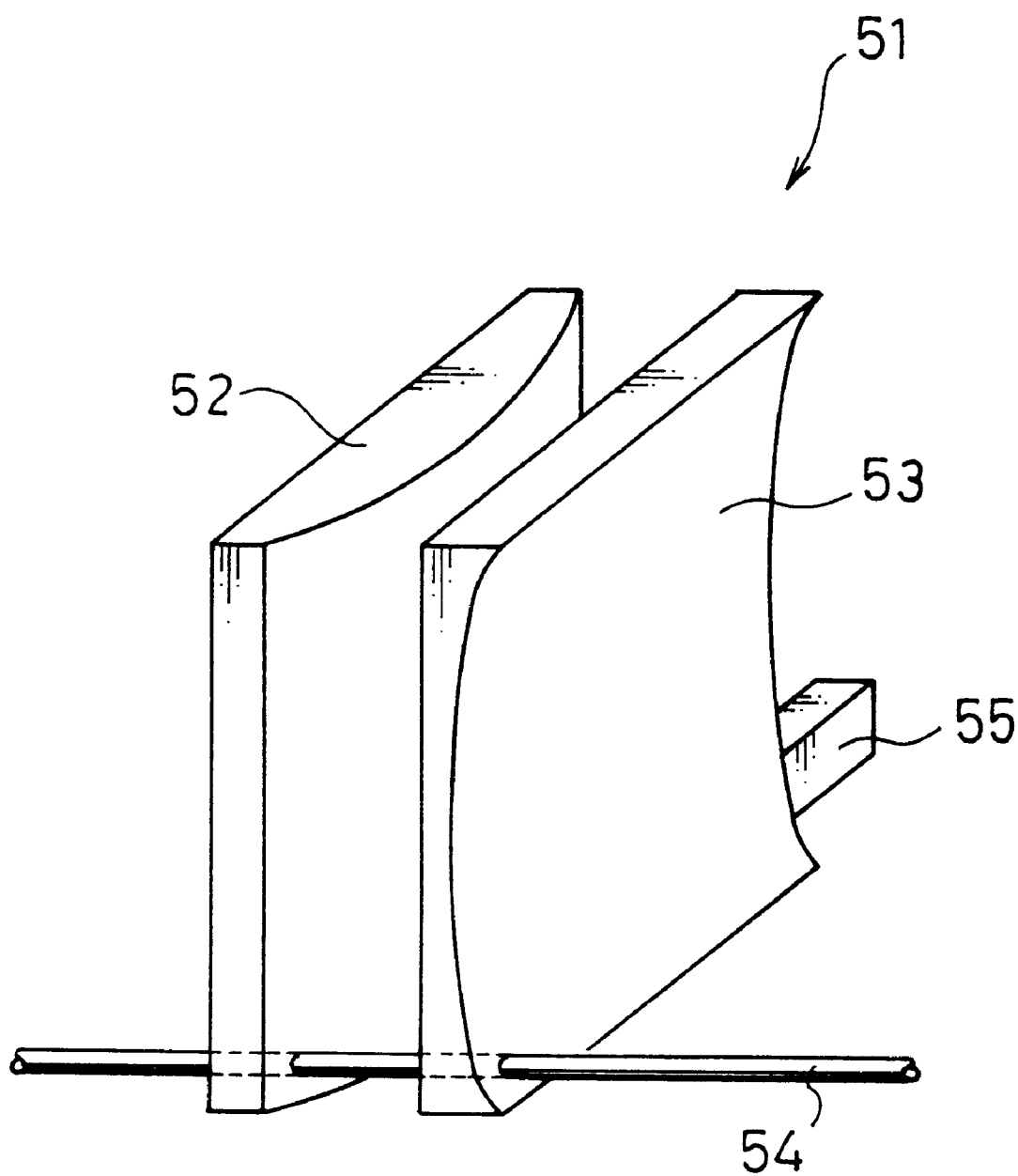
FIG. 11 is a view illustrating a schematic arrangement of a ratio changing mechanism used in an imaging apparatus in accordance with another embodiment of the present invention.

The following description will explain an embodiment while referring to FIGS. 11 through 12. The members having the same structure (function) as those in the above-mentioned embodiment will be designated by the same reference numerals and their description will be omitted. The following description on the present embodiment will focus on differences of the present embodiment from the first embodiment.

As illustrated in FIG. 11, an imaging apparatus of the present embodiment is equipped with, instead of the ratio changing mechanism 16, a ratio changing mechanism 51 as the aspect ratio changing means which has, as aspect ratio changing lenses (ratio changing lenses), two lenses 52 and 53 having different indexes respectively.

In FIG. 11, the lens 52, one of the lenses, is a convex lens which has a semicircular cross-section in the case where the lens 52 is sectioned along a horizontal center line (that is, a plano-convex lens). The lens 53, the other one, is a concave lens which has a cross-section with one edge thereof in an arc in the case where the lens 53 is sectioned along a vertical center line (that is, a plano-concave lens). The lenses 52 and 53 are positioned in parallel so that the convex surface of the lens 52 faces a surface of the lens 53 which is opposite to the concave surface. Furthermore, a lens rotating shaft 54 to support the lenses 52 and 53 is provided so as to pierce one lower corner of each of the lenses 52 and 53 (in FIG. 11, the lower left corners of the lenses 52 and 53). At the other lower corners opposite to the corners where the lens rotating shaft 54 is provided (that is, the lower right corners of the lenses 52 and 53 in FIG. 11), a lever 55 as aspect ratio selecting means is fixed, for selecting a desired aspect ratio among a plurality of aspect ratios by reciprocally rotating the lenses 52 and 53. At the other lower corners opposite to the corners where the lens rotating shaft 54 is provided (that is, the lower right corners of the lenses 52 and 53 in FIG. 11), a lever 55 as aspect ratio selecting means is fixed, for selecting a desired aspect ratio among a plurality of aspect ratios by reciprocally rotating the lenses 52 and 53.

The ratio changing mechanism 51 changes a horizontal ratio of the aspect ratio with the use of the lens 52 which is a convex lens, while changes a vertical ratio of the aspect ratio with the use of the lens 53 which is a concave lens.

In the present embodiment, the camera unit 3 is equipped with a converging lens 15, a ratio changing mechanism 51, a CCD 17, a front camera cover 31, a rear camera cover 32, and the like, as illustrated in FIG. 12(b). On the front camera cover 31, the converging lens 15 is fixed, while an aperture section 33 is formed in a substantially arc shape, at a position where the ratio changing mechanism 51 is installed. On the other hand, on an optical axis of the converging lens 15 and the lenses 52 and 53 on the rear camera cover 32, the CCD 17 is positioned.

The ratio changing mechanism 51 is provided between the converging lens 15 and the CCD 17 so that the lenses 52 and 53 are supported by the rotating shaft 54, and so that the lever 55, which is fixed at the lower corner on the opposite side to the side where the rotating shaft 54 is provided, protrudes from the aperture section 33, as illustrated in FIG. 12(a).

The lenses 52 and 53 are arranged so as be moved away from the optical axis of the converging lens 15 between the converging lens 15 and the CCD 17, by reciprocally rotating the lenses 52 and 53 around the lens rotating shaft 54 as a rotating axis. In other words, the lenses 52 and 53 of the ratio changing mechanism 51 are provided so as to fall on the optical axis of the converging lens 15 between the same and the CCD 17 when necessary and so as to be moved away from the optical axis when necessary. Thus, in the present embodiment, an aspect ratio of the object image projected on the CCD 17 is selected and changed by moving the lenses 52 and 53.

In the present embodiment, the wide vision mode with the aspect ratio of 16:9 is realized when the lever 55 is positioned at an upper end 33a of the aperture section 33, that is, when the lenses 52 and 53 are not on the optical axis of the converging lens 15 between the converging lens 15 and the CCD 17. On the other hand, the normal mode with the aspect ratio of 4:3 is realized when the lever 55 is positioned at a lower end 33b of the aperture section 33, that is, when the lenses 52 and 53 are on the optical axis of the converging lens 15 between the converging lens 15 and the CCD 17.

In short, in the present embodiment, the lenses 52 and 53 are provided on the optical axis only in the case where the aspect ratio selected by the lever 55 as the aspect ratio selecting means is different from the aspect ratio of the CCD 17.

Thus, with the arrangement of the present embodiment wherein the ratio changing mechanism 51 as the aspect ratio changing means is provided between the converging lens 15 and the CCD 17 as the imaging means, the aspect ratio which is optically determined through the converging lens 15 is selectively changed so as to substantially coincide with the aspect ratio of the CCD 17, so that the light having entered through the converging lens 15 is projected all over the image surface of the CCD 17.

As a result, the imaging apparatus of the present embodiment is capable of imaging object images in a plurality of sizes respectively, without a decrease in the number of the effective elements of the CCD 17. Therefore, by using this imaging apparatus, object images differing in the aspect ratio can be selectively obtained with excellent image quality. For this reason, the imaging apparatus of the present embodiment has superior display performance, as compared with the conventional imaging apparatuses.

Besides, in the present embodiment, an object image with an aspect ratio of 4:3 which is optically determined through the converging lens 15 can be projected onto the CCD 17, with the aspect ratio being changed to 16:9 by the lenses 52 and 53. Therefore, even in the case where an object image with an aspect ratio different from that of the CCD 17 used is to be obtained, all the elements of the CCD 17 are utilized.

Furthermore, in the present embodiment, the number of the constituent elements increases as compared with the first embodiment, but the adjustment of the refractive indexes and the manufacture are facilitated since the refractive index in the horizontal direction and the refractive index in the vertical direction are discretely changed. Moreover, in the present embodiment, images of more excellent quality than those in the first embodiment can be obtained since all the elements of the CCD 17 are used.

In the present embodiment, the aspect ratio is changed with the use of the two lenses 52 and 53, but it is also possible to project an image with an aspect ratio of 4:3 substantially all over the imaging surface of the CCD 17 with the aspect ratio of 16:9, with the use of only either a concave lens or a convex lens. To be more specific, in the case where an image of an aspect ratio of 4:3 is to be projected substantially all over the image surface of the CCD 17, a convex lens may be used so as to maintain a horizontal length of the image while narrow a vertical width of the image, so as to change the aspect ratio. Alternatively, a concave lens may be used so as to maintain a vertical width of the image while widen a horizontal length of the image, so as to change the aspect ratio.

However, in the case where the two lenses 52 and 53 are used to change the aspect ratio, as described above, the focal distance can be shortened, compared with the case where either a convex lens or a concave lens is used. Therefore, by using the two lenses 52 and 53 so as to change the aspect ratio, the size of the camera unit 3, and even the size of the imaging apparatus as a whole, is reduced.

Furthermore, in the case where either a convex lens or a concave lens is used so as to change the aspect ratio, an operation for exchanging the lenses and a space for storing a lens not used are necessitated. However, as described above, in the case where a combination of the convex lens 52 and the concave lens 53 is used, the aspect ratio can be changed only by rotating the lenses 52 and 53. Therefore, exchange of lenses or a space where a lens not used is stored are not necessitated.

Third Embodiment

The following description will explain a third embodiment of the present invention, while referring to FIGS. 13 and 14. The members having the same structure (function) as those in the above-mentioned embodiment will be designated by the same reference numerals and their description will be omitted. The following description on the present embodiment will mainly focus on differences of the present embodiment from the first embodiment.

An imaging apparatus of the present embodiment is equipped with, in the place of the ratio changing mechanism 16, a ratio changing mechanism 61 as the aspect ratio changing means which has four glass plates 62 serving as reflecting plates, as illustrated in FIG. 13(b).

The ratio changing mechanism 61 of the present embodiment is composed of the glass plates 62, a glass plate holder 63, a switch 64 as aspect ratio selecting means, four glass plate supporting shafts 65, four switch supporting shafts 66, and the like.

The switch 64 causes the glass plates 62 to rotate, thereby changing angles of the glass plates 62, so that a desired aspect ratio is selected among a plurality of aspect ratios. One glass plate supporting shaft 65 is provided at each corner of the glass plate holder 63, and supports one corresponding glass plate 62 by holding one edge of the glass plate 62. One switch supporting shaft 66 is provided on an edges of each glass plate 62 which is opposite to the edge where the glass plate supporting shaft 65 is provided, so as to support the glass plate 62 and connect the glass plate 62 with the switch 64.

In the ratio changing mechanism 61, the glass plates 62, supported by the glass plate supporting shafts 65 provided at the corners of the glass plate holder 63, are arranged as follows: two pairs of the glass plates 62 are vertically provided in parallel so that one in the left in each pair faces with each other while the other one in the right in each pair faces with each other. Each glass plate 62 is rotatably supported by the corresponding glass plate supporting shaft 65 and the corresponding switch supporting shaft 66, and rotates in an interlocked manner with a shift of the switch 64, thereby reflecting light having entered through the converging lens 15.

In the present embodiment, the camera unit 3 has the converging lens 15, the ratio changing mechanism 61, a CCD 17, a front camera cover 71, and a rear camera cover 72, and the like. The converging lens 15 is provided on the front camera cover 71, and a portion of the front camera cover 71 in a rectangular shape at a position of the switch 64 is cut out (hereinafter referred to as cutout section 71a). On the other hand, the CCD 17 is provided on the camera rear cover 72 so as to fall on the optical axis of the converging lens 15, while a portion of the rear cover 72 in a rectangular shape at a position of the switch 64 is cut out (hereinafter referred to as cutout section 72a) The cutout sections 71a and 72a are provided vis-a-vis, so as to form an aperture section 73 as shown in FIG. 13(a). The ratio changing mechanism 61 is provided between the converging lens 15 and the CCD 17 so that the switch 64 protrudes from the aperture section 73, as illustrated in FIG. 13(a).

In the present embodiment, for example, assume that the wide vision mode with the aspect ratio of 16:9 is realized when the switch 64 is positioned at a lower end 73b of the aperture section 73, and that the normal mode with the aspect ratio of 4:3 is realized when the switch 64 is positioned at an upper end 73a of the aperture section 73.

By doing so, for example, when the switch 64 is positioned at the lower end 73b of the aperture section 73, as illustrated in FIG. 14(a), the light having entered through the converging lens 15 (represented by two-dot chain lines in the figure) passes between the glass plates 62 and is projected on the CCD 17, since the glass plates 62 are provided in parallel with the optical axis of the converging lens 15 between the converging lens 15 and the CCD 17 so that the optical axis runs between the glass plates 62. Therefore, an object image with an aspect ratio of 16:9 is projected on the CCD 17 as it is, namely, as the object image with the aspect ratio of 16:9.

On the other hand, when the switch 64 in the state shown in FIG. 14(a) is pushed up to the upper end 73a of the aperture section 73, the switch supporting shafts 66 connected to the switch 64 are simultaneously pulled up. As a result, as illustrated in FIG. 14(b), the glass plates 62, which rotate in the interlocked manner with the switch supporting shafts 66, reflect the light having entered through the converging lens is (represented by two-dot chain line in the figure), one after another in an arrow direction, and finally it is projected on the CCD 17. Therefore, by curving at least one of the glass plates 62 either in a convex form or in a concave form, an object image with an aspect ratio of 4:3 is changed into an object image with an aspect ratio of 16:9, and is projected on the CCD 17.

Thus, in the present embodiment, the ratio changing mechanism 61 as the aspect ratio changing means is provided between the converging lens 15 and the CCD 17 as the imaging means. Therefore, the aspect ratio optically determined through the converging lens 15 is selectively changed so as to substantially coincide with the aspect ratio of the CCD 17, so that the light entering through the converging lens 15 is projected throughout the image surface of the CCD 17.

As a result, the imaging apparatus of the present embodiment is made capable of imaging object images in a plurality of sizes without a decrease in the number of the effective elements of the CCD 17. For this reason, by using the imaging apparatus thus arranged, object images differing in the aspect ratio are selectively obtained with excellent image quality. Thus, with the arrangement of the present embodiment, it is possible to provide the imaging apparatus having superior display performance to the conventional ones.

Note that a case where four of the glass plates 62 are used has been shown as an example of the present embodiment, but the numbers of the glass plates 62, the glass plate supporting shafts 65 for supporting the glass plates 62, and the switch supporting shafts 66 are not specifically limited, as long as the glass plates 62 are rotatably provided in parallel with the optical axis and are capable of reflecting the light having entered through the converging lens 15 when rotated thereby falling on the optical axis.

Fourth Embodiment

Figure 15:
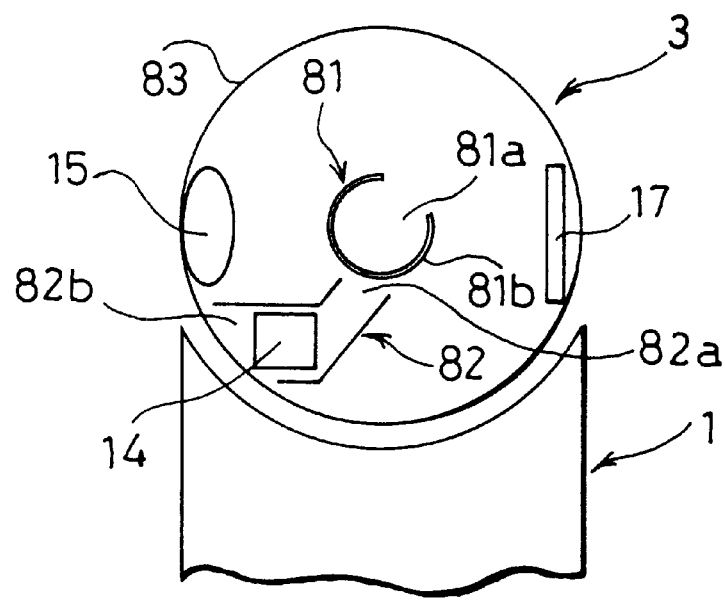
FIG. 15(a) is a cross-sectional view schematically illustrating an arrangement in the vicinity of a microphone in a camera unit provided in an imaging apparatus in accordance with still another embodiment of the present invention when the normal operation is carried out.
FIG. 15(b) is a cross-sectional view schematically illustrating an arrangement in the vicinity of the microphone in the camera unit of FIG. 15(a) when the vis-a-vis operation is carried out.
Figure 15:
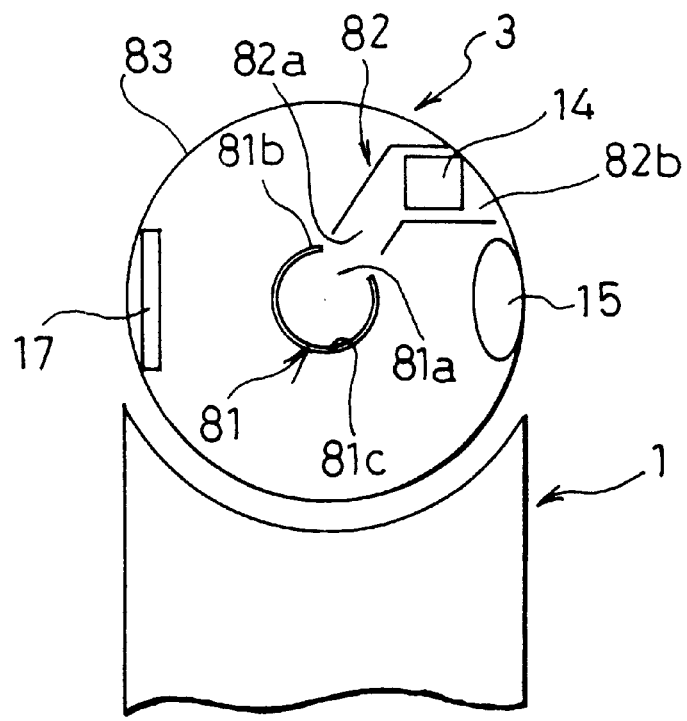

The following description will explain still another embodiment of the present invention, while referring to FIGS. 15 through 17. The members having the same structure (function) as those in the above-mentioned embodiment will be designated by the same reference numerals and their description will be omitted.

The following description of the present embodiment will focus on the directivity of the microphone 14 installed in the camera unit 3. In the present embodiment, the camera 3 has a camera rotating section 27 (see FIG. 1) as the rotating means. The camera rotating section 27 rotates the camera unit 3 incorporating the CCD 17, thereby enabling both the normal operation for taking an object image in front of the user and the vis-a-vis operation carried out with the converging lens 15 of the camera unit 3 directed to the user side.

Generally, when the normal operation is carried out, objects to be imaged widely range. Therefore, sounds from a wide range have to be caught. On the other hand, in the case where the vis-a-vis operation is carried out with the converging lens 15 of the camera unit 3 directed toward the user, usually sounds may be caught only from the vicinity of the imaging apparatus.

Therefore, the microphone 14 preferably has two switchable functions, one for picking up sounds from a wide range during the imaging operation with respect to objects in front of the user (ahead of the camera unit 3), and the other for picking up sounds from a narrow range during the vis-a-vis operation. In short, the microphone 14 desirably has directivity in a single specific direction in the case of the vis-a-vis operation, while it has non-directivity in the case of the normal operation.

In the present embodiment, in order to switch the directivity of the microphone 14 in accordance with the imaging state, as illustrated in FIGS. 15(a) and 15(b), the camera unit 3 incorporates a sound recording direction switching section composed of (1) a fixed cylinder 81 as a fixed member, and (2) a microphone holding cylinder 82 as a sound recording means supporting member which is hollow, incorporates the microphone 14, and has an aperture section 82a at one end and an aperture section 82b at the other end.

The fixed cylinder 81 is installed between the converging lens 15 and the CCD 17, fixed and supported, not by supporting means for supporting a camera cover 83 and other components of the camera unit 3, but by another supporting means in the camera unit 3, so that the fixed cylinder 81 does not rotate when the camera unit 3 rotates. The fixed cylinder 81 has an aperture section 81a, which results on cutting out a portion of the fixed cylinder 81.

On the other hand, the microphone holding cylinder 82 is provided so as to move around the fixed cylinder 81 as the camera unit 3 rotates. The microphone holding cylinder 82 is provided so that one end thereof is positioned adjacent to the fixed cylinder 81, while the other end thereof is positioned in the vicinity of the converging lens 15 installed on the camera cover 83 of the camera unit 3 Thus, the microphone holding cylinder 82 serves as a passage connecting the fixed cylinder 81 and the vicinity of the converging lens 15. In other words, the microphone holding cylinder 82 has the aperture section 82a at the end thereof facing the fixed cylinder 81, and the aperture section 82b at the other end thereof, that is, in the vicinity of the inner surface of the camera cover 83. Furthermore, the microphone 14 is positioned in the microphone holding cylinder 82 so as to be closer to the aperture section 82b than to the other end, and by doing so, the microphone holding cylinder 82 holds the microphone 14 in the area surrounding the fixed cylinder 81.

The following description will explain operations and directivity of the camera unit 3 in the normal operation and the vis-a-vis operation, while referring to FIGS. 15(a) through 16(b).

Here, FIG. 15(a) is a cross-sectional view illustrating a schematic arrangement of the camera unit 3 in the normal operation, while FIG. 15(b) is a cross-sectional view illustrating a schematic arrangement of the camera unit 3 in the vis-a-vis operation.

As illustrated in FIG. 15(a), the aperture section 82a of the microphone holding cylinder 82 is closed with a circumferential wall 81b of the fixed cylinder 81 in the normal operation. Therefore, in the normal operation, a rear side (a side to the fixed cylinder 81) of the microphone 14 is closed with the circumferential wall 81b of the fixed cylinder 81.

Figure 16A:
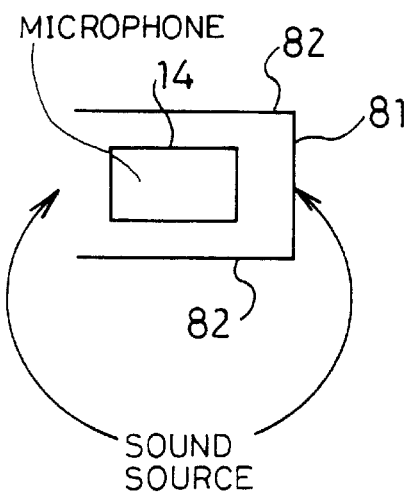
FIG. 16(a) is an explanatory view of directivity of the microphone during the normal operation.

In this case, as illustrated in FIG. 16(a), only one end (on the same side as a front side of the microphone 14) of the microphone holding cylinder 82 is opened. Therefore, acoustic waves from a sound source on the front side of the microphone 14 (on the front side of the camera unit 3) enter the microphone 14, without being drowned out by acoustic waves from the rear side of the microphone 14. Therefore, in the normal operation, the microphone 14 is capable of picking up sounds from a wide range ahead of the camera unit 3, having non-directivity.

On the other hand, as illustrated in FIG. 15(b), the microphone holding cylinder 82 and the fixed cylinder 81 are in a state such that the aperture section 82a of the microphone holding cylinder 82 faces the aperture section 81a of the fixed cylinder 81. Therefore, in the vis-a-vis operation, the rear side of the microphone 14 is open to a hollow 81c of the fixed cylinder 81.

Figure 16B:
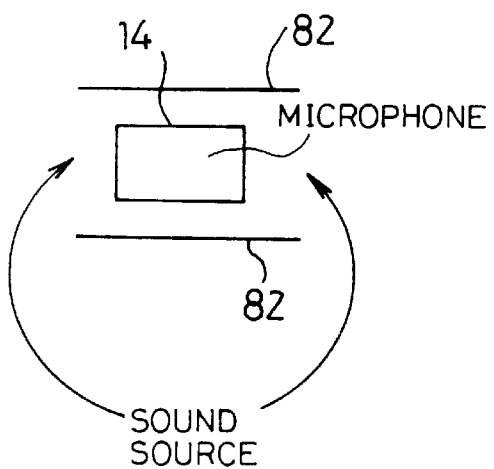
FIG. 16(b) is an explanatory view of directivity of the microphone during the vis-a-vis operation.

In this case, since the microphone holding cylinder 82 are open at both the ends as illustrated in FIG. 16(b), acoustic waves enter the microphone holding cylinder 82 through both the ends thereof (from both the front and rear sides of the microphone 14). Therefore, the acoustic waves entering the microphone holding cylinder 82 from the front and rear sides thereof drown out each other at a position of the microphone 14, thereby being not picked up by the microphone 14. This results in that the microphone 14 selectively picks up only sounds in a narrow range just beside the camera unit 3. For this reason, the microphone 14 in the vis-a-vis operation has directivity in a single direction.

Furthermore, in the imaging apparatus of the present embodiment, the switching of the directivity is interlocked with the rotation of the camera unit 3, that is, the rotation of the converging lens 15 and the CCD 17, so that the sound recording directivity is switched by switching the state of the rear side of the microphone 14 between the opening state and the closing state with the use of the fixed cylinder 81.

Figure 17A:
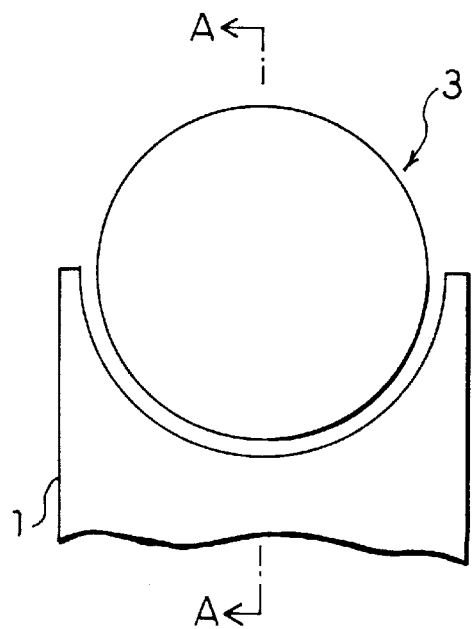
FIG. 17(a) is a side view illustrating an arrangement of a rotating part of the camera section.
Figure 17B:
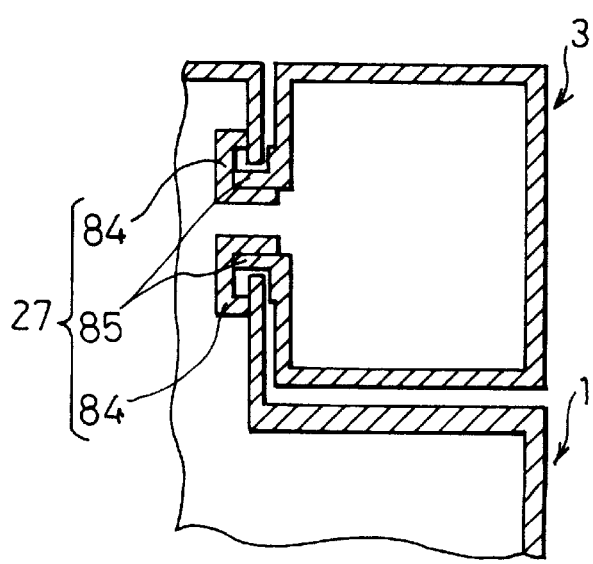
FIG. 17(b) is a cross-sectional view taken along arrow line A—A of the side view of FIG. 17(a).

The following description will explain the camera rotating section 27 of the camera unit 3, while referring to FIGS. 17(a) and 17(b). FIG. 17(b) illustrates a cross section of the camera unit 3 taken along an A—A arrow line of FIG. 17(a).

In the foregoing imaging apparatus, at a junction position of the camera unit 3 with the main body cabinet 1, there are provided joints 85, which matches joints 84 provided on the main body cabinet unit 1. The joints 84 and 85 constitute the camera rotating section 27. The camera unit 3 is rotatably provided on the main body cabinet unit 1 with the use of the joints 84 and 85 which grip the main body cabinet unit 1, so as to turn to a direction desired by the user.

Thus, the imaging apparatus of the present embodiment is composed of (1) the CCD 17 as imaging means which images object images and is rotatably provided so as to turn to a desired direction, either a normal direction or a direction opposite to the normal direction, (2) the microphone 14 as sound recording means which moves in the interlocked manner with the rotation of the CCD 17, and (3) the sound recording direction switching section (that is, the fixed cylinder 81 and the microphone holding cylinder 82) as sound recording direction switching means for switching sound recording directions of the microphone 14 depending on the direction the CCD 17 faces.

In the present embodiment, the camera unit 3 equipped with the CCD 17 is, for example, rotatably supported by the camera rotating section 27, and hence, the CCD 17 is rotated by rotating the camera unit 3. Besides, in the present embodiment, the CCD 17 is rotated, and depending on a direction which the CCD 17 faces as a result of the rotation, the state of the rear side of the microphone 14 is switched between the opening state and the closing state with the use of the fixed cylinder 81, so that the directivity is switched.

Therefore, in the present embodiment, since the sound recording direction can be switched in the interlocked manner with the rotation of the CCD 17, the directivity of the microphone 14 can be switched depending on the direction which the CCD 17 faces (or, the direction which the converging lens 15 faces, the converging lens 15 being provided on an opposite position to the CCD 17 with respect to the fixed cylinder 81). Therefore, it is possible to carry out sound recording operations so as to be suited for the normal operation with respect to objects widely ranging, and the vis-a-vis operation with respect to objects in a relatively short distance, respectively. As a result, the imaging apparatus thus arranged is superior to the conventional ones in the sound recording performance. In the aforementioned imaging apparatus, the directivity of the microphone 14 can be switched so that the microphone 14 has non-directivity during the normal operation while has directivity in a single specific direction during the vis-a-vis operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging apparatus, comprising:

imaging means having a predetermined aspect ratio;

projecting means for projecting incident light onto said imaging means;

aspect ratio selecting means for selecting an aspect ratio from a plurality of pre-set aspect ratios, by adjusting an aspect ratio changing means;

aspect ratio changing means, provided between said projecting means and said imaging means, for selectively changing an aspect ratio optically determined through said projecting means into an aspect ratio in accordance with said aspect ratio selected by said aspect ratio selecting means and substantially coinciding with the aspect ratio of said imaging means, so that the light having entered through said projecting means is projected all over an image surface of said imaging means;

wherein said aspect ratio changing means includes a refractive index changing lens for, by rotating of the lens about an axis of said lens, changing refractive index of incident light; and wherein said aspect ratio changing means rotates said refractive index changing lens about said axis in an interlocked manner with said aspect ratio selecting means, so as to vary the aspect ratio optically determined through said projecting means.

2. An imaging apparatus, comprising:

imaging means having a predetermined aspect ratio;

projecting means for projecting incident light onto said imaging means;

aspect ratio selecting means for selecting an aspect ratio from a plurality of pre-set aspect ratios, by adjusting an aspect ratio changing means;

aspect ratio changing means, provided between said projecting means and said imaging means, for selectively changing an aspect ratio optically determined through said projecting means into an aspect ratio in accordance with said aspect ratio selected by said aspect ratio selecting means and substantially coinciding with the aspect ratio of said imaging means, so that the light having entered through said projecting means is projected all over an image surface of said imaging means; and wherein said aspect ratio changing means includes reflecting plates, rotatably provided in parallel with an optical axis of said projecting means between said projecting means and said imaging means, said reflecting plates rotating in an interlocked manner with said aspect ratio selecting means so as to reflect the light, so that the aspect ratio of the light varies.

3. The imaging apparatus as set forth in claim 1, further comprising:

memory means for storing an object image imaged by said imaging means, in a form of an image signal, together with an aspect ratio recognition signal for recognizing an aspect ratio selected among a plurality of aspect ratios; and output rate switching means for, when the image signal stored in said memory means is outputted and displayed as an object image, switching an output rate at which the image signal stored in said memory means is outputted, said output rate switching means switching the output rate in accordance with the aspect ratio recognition signal stored together with the image signal and between a wide-vision mode and a normal mode so that clock becomes slower in the wide-vision mode than in the normal mode.

4. The imaging apparatus as set forth in claim 1, further comprising:

memory means for storing an object image imaged by said imaging means, in a form of an image signal, together with an aspect ratio recognition signal for recognizing an aspect ratio selected among a plurality of aspect ratios; and control panel displaying means for, when the image signal stored in said memory means is outputted and displayed as the object image, displaying a control panel for controlling display on a display screen on which the object image is displayed, and switching a position at which the control panel is displayed, in accordance with the aspect ratio recognition signal stored together with the image signal.

5. The imaging apparatus as set forth in claim 4, wherein, when the display screen displays the object image at the aspect ratio of said imaging means and has a spare region where the object image is not displayed, the control panel is displayed in the spare region.

6. An imaging apparatus, comprising:

imaging means having a predetermined aspect ratio;

projecting means for projecting incident light onto said imaging means;

aspect ratio selecting means for selecting an aspect ratio from a plurality of pre-set aspect ratios, by adjusting an aspect ratio changing means;

aspect ratio changing means, provided between said projecting means and said imaging means, for selectively changing an aspect ratio optically determined through said projecting means into an aspect ratio in accordance with said aspect ratio selected by said aspect ratio selecting means and substantially coinciding with the aspect ratio of said imaging means, so that the light having entered through said projecting means is projected all over an image surface of said imaging means;

wherein said imaging means is rotatably provided;

sound recording means moving in an interlocked manner with rotation of said imaging means;

sound recording direction switching means for switching a sound recording direction of said sound recording means in accordance with a direction which said imaging means faces;

said sound recording direction switching means switching directivity of said sound recording means to have directivity in a single direction when imaging a facing object and to have non-directivity during normal operations; and wherein said sound recording direction switching means has a sound recording means supporting member, which is hollow, has apertures, and holds said sound recording means therein, for switching the sound recording direction of said sound recording means by opening or closing one of the apertures of said sound recording means supporting member in an interlocked manner with the rotation of said imaging means.

7. An imaging apparatus comprising:

imaging means for imaging an object image, rotatably provided so as to be capable of facing a direction in a normal state and an opposite direction to the direction in the normal state;

sound recording means moving in an interlocked manner with rotation of said imaging means;

sound recording direction switching means for switching a sound recording direction of said sound recording means in accordance with a direction which said imaging means faces; and said sound recording direction switching means switching directivity of said sound recording means to have directivity in a single specific direction when imaging a facing object and to have non-directivity during normal operation; and wherein said sound recording direction switching means includes a sound recording means supporting member, which is hollow, has apertures, and holds said sound recording means therein, for switching the sound recording direction of said sound recording means by opening or closing one of the apertures of said sound recording means supporting member in an interlocked manner with the rotation of said imaging means.

8. The imaging apparatus of claim 1, wherein said aspect ratio selecting means selects an aspect ratio which substantially coincides with the aspect ratio of the imaging means from the plurality of pre-set ratios, and wherein said aspect ratio changing means includes an element which rotates in an interlocked manner with the selecting means in accordance with the aspect ratio optically determined through the projecting means so as to change the aspect ratio.

9. The imaging apparatus of claim 1, wherein said aspect ratio selecting means comprises a lever for causing a lens of said aspect ratio changing means to rotate in an amount so as to select the aspect ratio from the plurality of pre-set ratios.

10. The imaging apparatus as set forth in claim 2, further comprising:

memory means for storing an object image imaged by said imaging means, in a form of an image signal, together with an aspect ratio recognition signal for recognizing an aspect ratio selected among a plurality of aspect ratios; and output rate switching means for, when the image signal stored in said memory means is outputted and displayed as an object image, switching an output rate at which the image signal stored in said memory means is outputted, said output rate switching means switching the output rate in accordance with the aspect ratio recognition signal stored together with the image signal and between a wide-vision mode and a normal mode so that clock becomes slower in the wide-vision mode than in the normal mode.

11. The imaging apparatus as set forth in claim 2, further comprising:

memory means for storing an object image imaged by said imaging means, in a form of an image signal, together with an aspect ratio recognition signal for recognizing an aspect ratio selected among a plurality of aspect ratios; and control panel displaying means for, when the image signal stored in said memory means is outputted and displayed as the object image, displaying a control panel for controlling display on a display screen on which the object image is displayed, and switching a position at which the control panel is displayed, in accordance with the aspect ratio recognition signal stored together with the image signal.

12. The imaging apparatus as set forth in claim 11, wherein, when the display screen displays the object image at the aspect ratio of said imaging means and has a spare region where the object image is not displayed, the control panel is displayed in the spare region.

* * * * *